United States Patent
Zhou et al.

(10) Patent No.: US 12,248,857 B2
(45) Date of Patent: Mar. 11, 2025

(54) BID VALUE DETERMINATION

(71) Applicant: Yahoo Ad Tech LLC, New York, NY (US)

(72) Inventors: Tian Zhou, Sunnyvale, CA (US); Djordje Gligorijevic, San Jose, CA (US); Bharatbhushan Shetty, Sunnyvale, CA (US); Junwei Pan, Sunnyvale, CA (US); Brendan Kitts, Seattle, WA (US); Shengjun Pan, San Jose, CA (US); Balaji Srinivasa Rao Paladugu, San Jose, CA (US); Sneha Thomas, San Jose, CA (US); Aaron Flores, Menlo Park, CA (US)

(73) Assignee: Yahoo Ad Tech LLC, New York, NY (US)

(*) Notice: Subject to any disclaimer, the term of this patent is extended or adjusted under 35 U.S.C. 154(b) by 0 days.

(21) Appl. No.: 18/197,165

(22) Filed: May 15, 2023

(65) Prior Publication Data

US 2023/0281512 A1    Sep. 7, 2023

Related U.S. Application Data

(63) Continuation of application No. 16/994,930, filed on Aug. 17, 2020, now Pat. No. 11,651,284.

(51) Int. Cl.
    *G06Q 30/00* (2023.01)
    *G06F 17/18* (2006.01)
    (Continued)

(52) U.S. Cl.
    CPC .............. *G06N 20/00* (2019.01); *G06F 17/18* (2013.01); *G06N 5/04* (2013.01); *G06Q 30/0275* (2013.01)

(58) Field of Classification Search
None
See application file for complete search history.

(56) References Cited

U.S. PATENT DOCUMENTS

| | | | |
|---|---|---|---|
| 2018/0040032 A1* | 2/2018 | Chalasani | G06Q 30/0277 |
| 2018/0075493 A1* | 3/2018 | Agarwal | G06Q 30/0261 |
| 2021/0150584 A1* | 5/2021 | Volkovich | G06Q 30/0277 |

OTHER PUBLICATIONS

Development of Automated Dynamic Bidding Agents for Final Price Prediction in Online Auctions Kaur, Preetinder. PQDT—GlobalProQuest Dissertations Publishing. (2014) (Year: 2014).*

(Continued)

*Primary Examiner* — Matthew T Sittner
(74) *Attorney, Agent, or Firm* — Cooper Legal Group LLC

(57) ABSTRACT

One or more computing devices, systems, and/or methods are provided. Shaded bid values may be determined and/or submitted to one or more auction modules for participation in auctions. Auction information including at least one of minimum bid values to win associated with the auctions, sets of features associated with the auctions, the shaded bid values associated with the auctions, unshaded bid values associated with the auctions, etc. may be stored in a database. A machine learning model may be trained using a loss function and/or the auction information to generate a first machine learning model with feature parameters associated with features. A bid request, indicative of a second set of features, may be received. The first machine learning model may be used to determine a shaded bid value for submission based upon one or more first feature parameters, of the feature parameters, associated with the second set of features.

20 Claims, 17 Drawing Sheets

(51) Int. Cl.
*G06N 5/04* (2023.01)
*G06N 20/00* (2019.01)
*G06Q 30/0273* (2023.01)

(56) References Cited

OTHER PUBLICATIONS

Going, going: surprise bids at auction: [5 IT Tabloid Edition] Gengler, Barbara. The Australian: 3. Canberra, A.C.T.: Nationwide News Pty Ltd. (Apr. 25, 2006) (Year: 2006).*

Assessing Advertising Bids in Generalized-Secondary Auctions for Improved Selection of Search Engine Keywords, Humpherys, Sean L; Meredith, Neil R. Journal of the Southwestern Society of Economists 44: 43-65. Beaumont: West Texas A&M University, College of Business. (2017) (Year: 2017).*

* cited by examiner

BID VALUE DETERMINATION

RELATED APPLICATION

This application claims priority to and is a continuation of U.S. application Ser. No. 16/994,930, filed on Aug. 17, 2020, entitled "BID VALUE DETERMINATION", which is incorporated by reference herein in its entirety.

BACKGROUND

Many services, such as websites, applications, etc. may provide platforms for viewing media. For example, a user may interact with a service. While interacting with the service, selected media may be presented to the user automatically. Some of the media may be advertisements advertising products and/or services associated with a company.

SUMMARY

In accordance with the present disclosure, one or more computing devices and/or methods are provided. In an example, a first bid request may be received. The first bid request is associated with a first request for content associated with a first client device. The first bid request is indicative of a first set of features comprising one or more first features associated with the first request for content. A first shaded bid value associated with the first content item may be determined based upon a first bid value associated with a first content item. The first shaded bid value may be submitted to a first auction module for participation in a first auction associated with the first request for content. A first minimum bid to win indication may be received. The first minimum bid to win value may correspond to a first minimum bid value to win the first auction. A first set of auction information associated with the first auction may be stored in an auction information database. The first set of auction information is indicative of the first set of features, the first shaded bid value and/or the first minimum bid value to win. The auction information database comprises a plurality of sets of auction information, comprising the first set of auction information, associated with a plurality of auctions comprising the first auction. A machine learning model may be trained using a first loss function and the plurality of sets of auction information to generate a first machine learning model comprising a plurality of feature parameters associated with a plurality of features of the plurality of sets of auction information. The first loss function comprises a first value and a second value. The first value corresponds to the first minimum bid value to win or to an optimal bid reduction factor determined based upon the first minimum bid value to win and the first bid value. The second value corresponds to the first shaded bid value or to a bid reduction factor used to determine the first shaded bid value. A second bid request may be received. The second bid request is associated with a second request for content associated with a second client device. The second bid request is indicative of a second set of features comprising one or more second features associated with the second request for content. A second bid value associated with a second content item may be determined. A second shaded bid value associated with the second content item may be determined using the first machine learning model based upon the second bid value and one or more first feature parameters, of the plurality of feature parameters, associated with the second set of features. The second shaded bid value may be submitted to a second auction module for participation in a second auction associated with the second request for content.

In an example, a first bid request may be received. The first bid request is associated with a first request for content associated with a first client device. The first bid request is indicative of a first set of features comprising one or more first features associated with the first request for content. A first shaded bid value associated with the first content item may be determined based upon a first bid value associated with a first content item. The first shaded bid value may be submitted to a first auction module for participation in a first auction associated with the first request for content. A first minimum bid to win indication may be received. The first minimum bid to win value may correspond to a first minimum bid value to win the first auction. A first set of auction information associated with the first auction may be stored in an auction information database. The first set of auction information is indicative of the first set of features, the first shaded bid value and/or the first minimum bid value to win. The auction information database comprises a plurality of sets of auction information, comprising the first set of auction information, associated with a plurality of auctions comprising the first auction. A first plurality of values associated with the plurality of auctions may be determined. The first plurality of values corresponds to a plurality of minimum bid values to win indicated by the plurality of sets of auction information or to a plurality of optimal bid reduction factors determined based upon the plurality of minimum bid values to win and a plurality of bid values indicated by the plurality of sets of auction information. A first value of the first plurality of values corresponds to the first minimum bid value to win or to a first optimal bid reduction factor determined based upon the first minimum bid value to win and the first bid value. A second plurality of values associated with the plurality of auctions may be determined. The second plurality of values corresponds to a plurality of shaded bid values indicated by the plurality of sets of auction information or to a plurality of bid reduction factors used to determine the plurality of shaded bid values. A second value of the second plurality of values corresponds to the first shaded bid value or to a first bid reduction factor used to determine the first shaded bid value. A plurality of differences may be determined based upon the first plurality of values and the second plurality of values. A first difference of the plurality of differences corresponds to a difference between the first value and the second value. A plurality of feature parameters, associated with a plurality of features of the plurality of sets of auction information, may be generated based upon the plurality of sets of auction information and the plurality of differences. A second bid request may be received. The second bid request is associated with a second request for content associated with a second client device. The second bid request is indicative of a second set of features comprising one or more second features associated with the second request for content. A second bid value associated with a second content item may be determined. One or more first feature parameters, of the plurality of feature parameters, associated with the second set of features may be identified. A second shaded bid value associated with the second content item may be determined based upon the one or more first feature parameters and the second bid value. The second shaded bid value may be submitted to a second auction module for participation in a second auction associated with the second request for content.

In an example, a first bid request may be received. The first bid request is associated with a first request for content associated with a first client device. The first bid request is indicative of a first set of features comprising one or more first features associated with the first request for content. A first shaded bid value associated with the first content item may be determined based upon a first bid value associated with a first content item. The first shaded bid value may be submitted to a first auction module for participation in a first auction associated with the first request for content. A first impression indication, indicative of whether the first content item is a winner of the first auction, may be received. A first set of auction information associated with the first auction may be stored in an auction information database. The first set of auction information is indicative of the first set of features, the first impression indication and/or the first shaded bid value. The auction information database comprises a plurality of sets of auction information, comprising the first set of auction information, associated with a plurality of auctions comprising the first auction. A machine learning model may be trained using the plurality of sets of auction information to generate a first machine learning model comprising a plurality of feature parameters associated with a plurality of features of the plurality of sets of auction information. A second bid request may be received. The second bid request is associated with a second request for content associated with a second client device. The second bid request is indicative of a second set of features comprising one or more second features associated with the second request for content. A second bid value associated with a second content item may be determined. A plurality of win probabilities associated with a plurality of shaded bid values may be determined based upon the second set of features and using the first machine learning model. Each shaded bid value of the plurality of shaded bid values does not exceed the second bid value. A first win probability of the plurality of win probabilities is associated with a second shaded bid value of the plurality of shaded bid values and corresponds to a probability that the second content item wins an auction associated with the second request for content responsive to submitting the second shaded bid value to an auction module associated with the second request for content. A third shaded bid value may be determined based upon the plurality of win probabilities associated with the plurality of shaded bid values. The third shaded bid value may be submitted to a second auction module for participation in a second auction associated with the second request for content.

In an example, a first bid request may be received. The first bid request is associated with a first request for content associated with a first client device. The first bid request is indicative of a first set of features comprising one or more first features associated with the first request for content. A first shaded bid value associated with the first content item may be determined based upon a first bid value associated with a first content item. The first shaded bid value may be submitted to a first auction module for participation in a first auction associated with the first request for content. A first impression indication, indicative of whether the first content item is a winner of the first auction, may be received. A first set of auction information associated with the first auction may be stored in an auction information database. The first set of auction information is indicative of the first set of features, the first impression indication and/or the first shaded bid value. The auction information database comprises a plurality of sets of auction information, comprising the first set of auction information, associated with a plurality of auctions comprising the first auction. A machine learning model may be trained using the plurality of sets of auction information to generate a first machine learning model comprising a plurality of feature parameters associated with a plurality of features of the plurality of sets of auction information. A second bid request may be received. The second bid request is associated with a second request for content associated with a second client device. The second bid request is indicative of a second set of features comprising one or more second features associated with the second request for content. A second bid value associated with a second content item may be determined. A plurality of expected bid surpluses associated with a plurality of shaded bid values may be determined based upon the second set of features and using the first machine learning model. Each shaded bid value of the plurality of shaded bid values does not exceed the second bid value. A first expected bid surplus of the plurality of expected bid surpluses is associated with a second shaded bid value of the plurality of shaded bid values. A third shaded bid value may be determined based upon the plurality of expected bid surpluses associated with the plurality of shaded bid values. The third shaded bid value may be submitted to a second auction module for participation in a second auction associated with the second request for content.

In an example, a first bid request may be received. The first bid request is associated with a first request for content associated with a first client device. The first bid request is indicative of a first set of features comprising one or more first features associated with the first request for content. A first shaded bid value associated with the first content item may be determined based upon a first bid value associated with a first content item. The first shaded bid value may be submitted to a first auction module for participation in a first auction associated with the first request for content. A first impression indication, indicative of whether the first content item is a winner of the first auction, may be received. A first set of auction information associated with the first auction may be stored in an auction information database. The first set of auction information is indicative of the first set of features, the first impression indication and/or the first shaded bid value. The auction information database comprises a plurality of sets of auction information, comprising the first set of auction information, associated with a plurality of auctions comprising the first auction. A plurality of feature parameters associated with a plurality of features of the plurality of sets of auction information may be generated based upon the plurality of sets of auction information. A second bid request may be received. The second bid request is associated with a second request for content associated with a second client device. The second bid request is indicative of a second set of features comprising one or more second features associated with the second request for content. A second bid value associated with a second content item may be determined. One or more first feature parameters, of the plurality of feature parameters, associated with the second set of features may be identified. A plurality of expected bid surpluses associated with a plurality of shaded bid values may be determined based upon the one or more first feature parameters. Each shaded bid value of the plurality of shaded bid values does not exceed the second bid value. A first expected bid surplus of the plurality of expected bid surpluses is associated with a second shaded bid value of the plurality of shaded bid values. A third shaded bid value may be determined based upon the plurality of expected bid surpluses associated with the plurality of shaded bid values. The third shaded bid value may be submitted to a second auction module for participation in a second auction associated with the second request for content.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
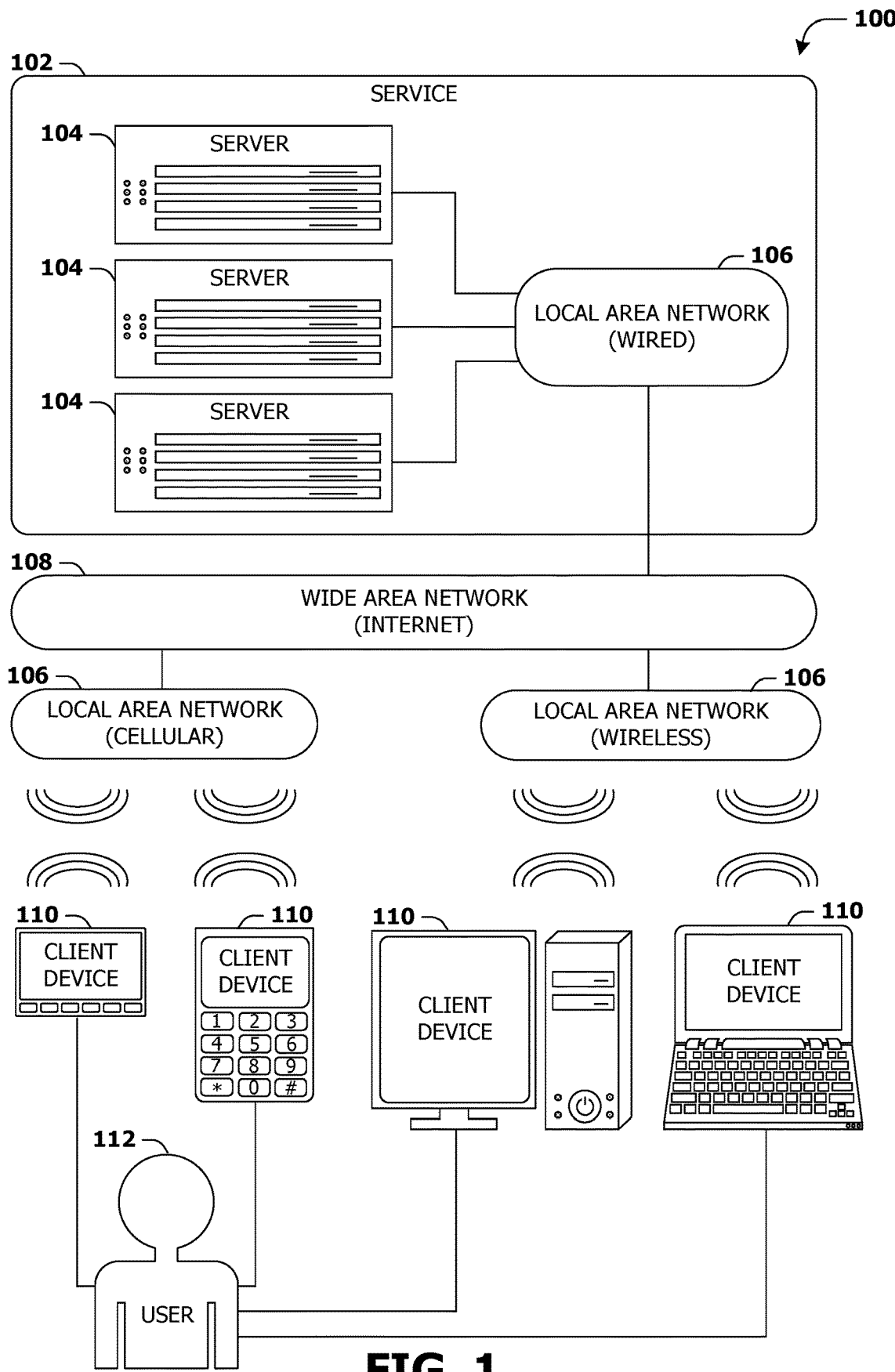
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
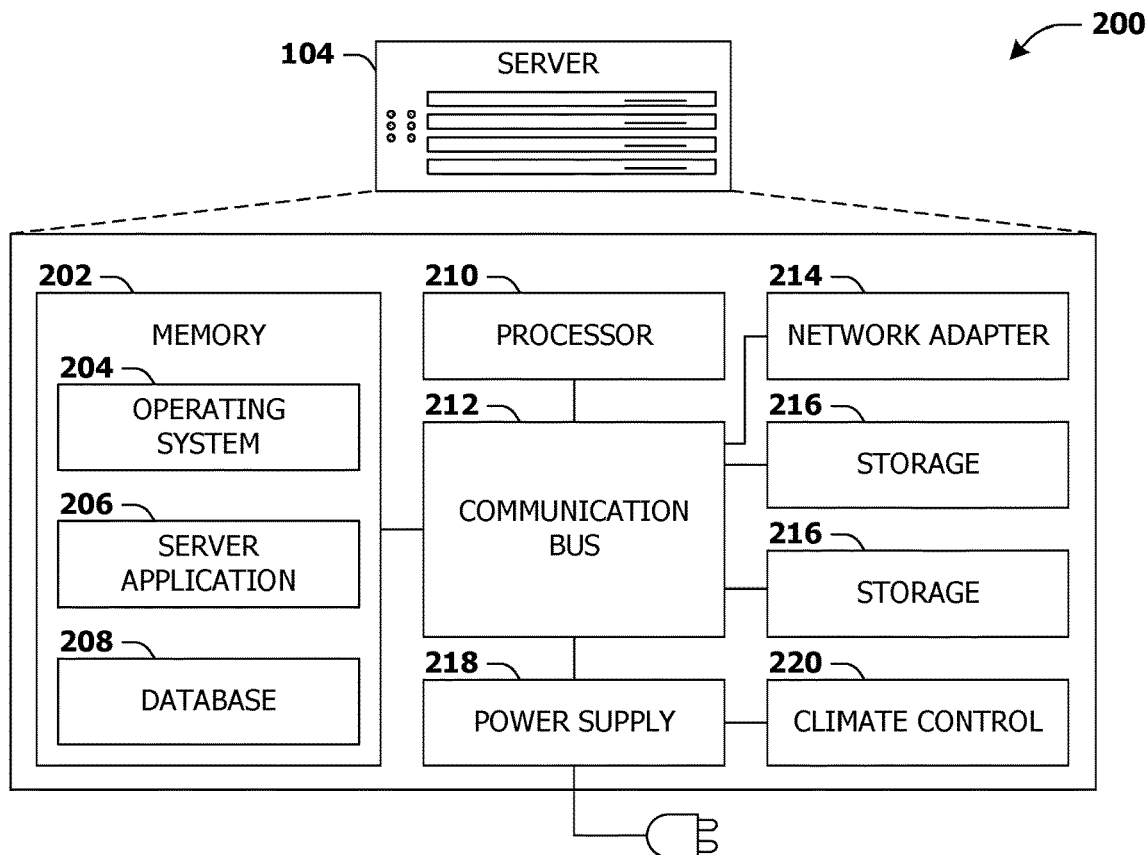
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
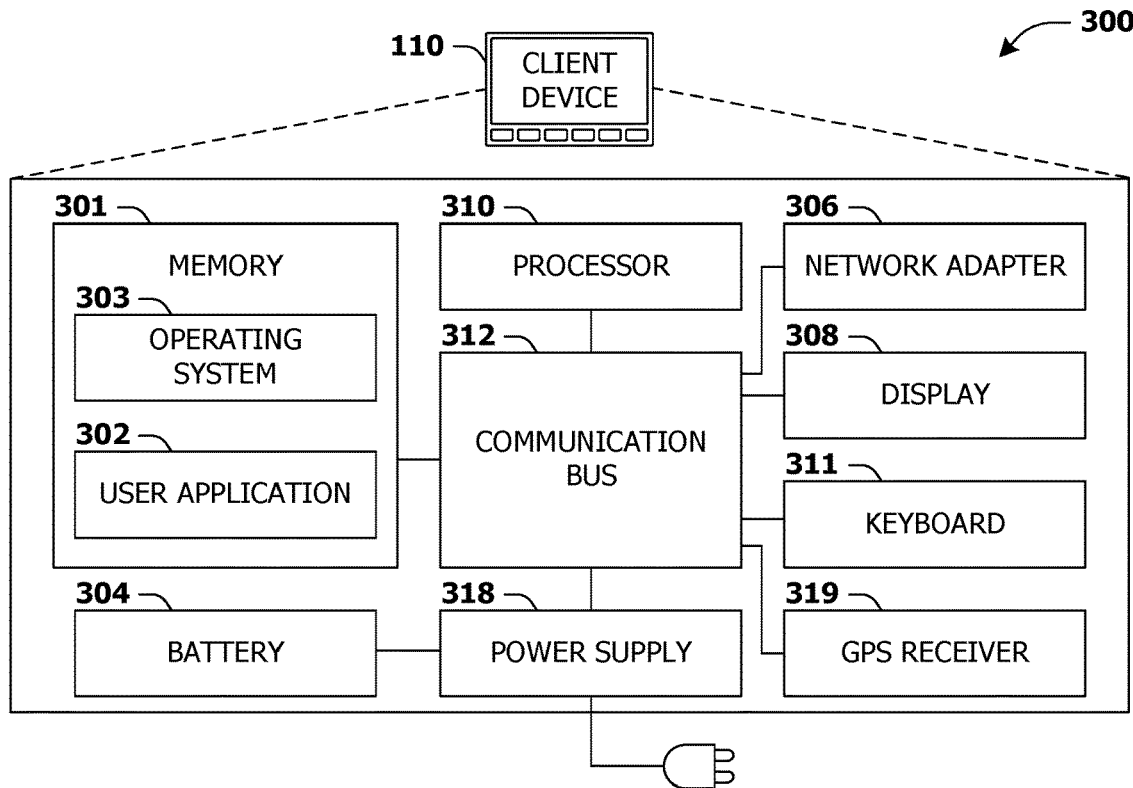
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining bid values for participation in auctions are provided. For example, an entity may access and/or interact with a service, such as an advertising service, that provides a platform for uploading content to one or more servers to be presented via client devices. For example, the content may comprise one or more content items (e.g., images, videos, audio, interactive graphical objects, etc.). In some examples, the one or more content items may correspond to one or more advertisements associated with the entity (e.g., the one or more advertisements may be associated with one or more products, one or more services, etc. provided by the entity). Alternatively and/or additionally, the platform may be used to upload information associated with a first content item (e.g., an advertisement) of the one or more content items (e.g., the information may comprise at least one of a budget associated with the first content item, a target audience associated with the first content item, one or more advertisement campaign goals associated with the first content item, etc.).

In some examples, the information may be used for determining bid values associated with the first content item. In an example, responsive to receiving a request for content, a first bid value associated with the first content item may be determined based upon the information. The first bid value may be submitted to an auction module for participation in an auction associated with the request for content. A winner of the auction may be determined based a plurality of bid values, comprising the first bid value, participating in the auction. In an example where the first bid value is the highest bid value among the plurality of bid values, the winner of the auction may correspond to the first content item. Responsive to winning the auction, the first content item may be presented via a client device and/or an internet resource associated with the request for content. In some auctions, such as first-price auctions, an amount of compensation for presenting the first content item is based upon and/or equal to the first bid value. Thus, had the first bid value been reduced to a shaded bid value (a reduced bid value) that is higher than a second highest-bid value among the plurality of bid values, the first content item would be the winner of the auction, but the amount of compensation would be less (such as equal to the shaded bid value). Techniques are presented herein for determining shaded bid values to increase savings and/or reduce expenses associated with presenting content after winning auctions.

An objective of one or more of the techniques presented herein may be to optimize a bid surplus associated with savings accrued as a result of reducing bid values to shaded bid values and submitting the shaded bid values for participation in auctions. For example, a total bid surplus associated with a plurality of auctions may correspond to bid surplus=$\Sigma_{i=1}^{N}(b_i^u-b_i)I(b_i)$, where i corresponds to an auction index associated with the plurality of auctions, N corresponds to a quantity of auctions of the plurality of auctions, $b_i^u$ corresponds to an unshaded bid value associated with an auction of the plurality of auctions, $b_i$ corresponds to a shaded bid value submitted for participation in the auction, $I(b_i)$ is equal to 1 if the shaded bid value won the auction, and/or $I(b_i)$ is equal to 0 if the shaded bid value did not win the auction. The plurality of auctions may correspond to auctions performed during a period of time (e.g., an hour, a day, or a different period of time).

Figure 4A:
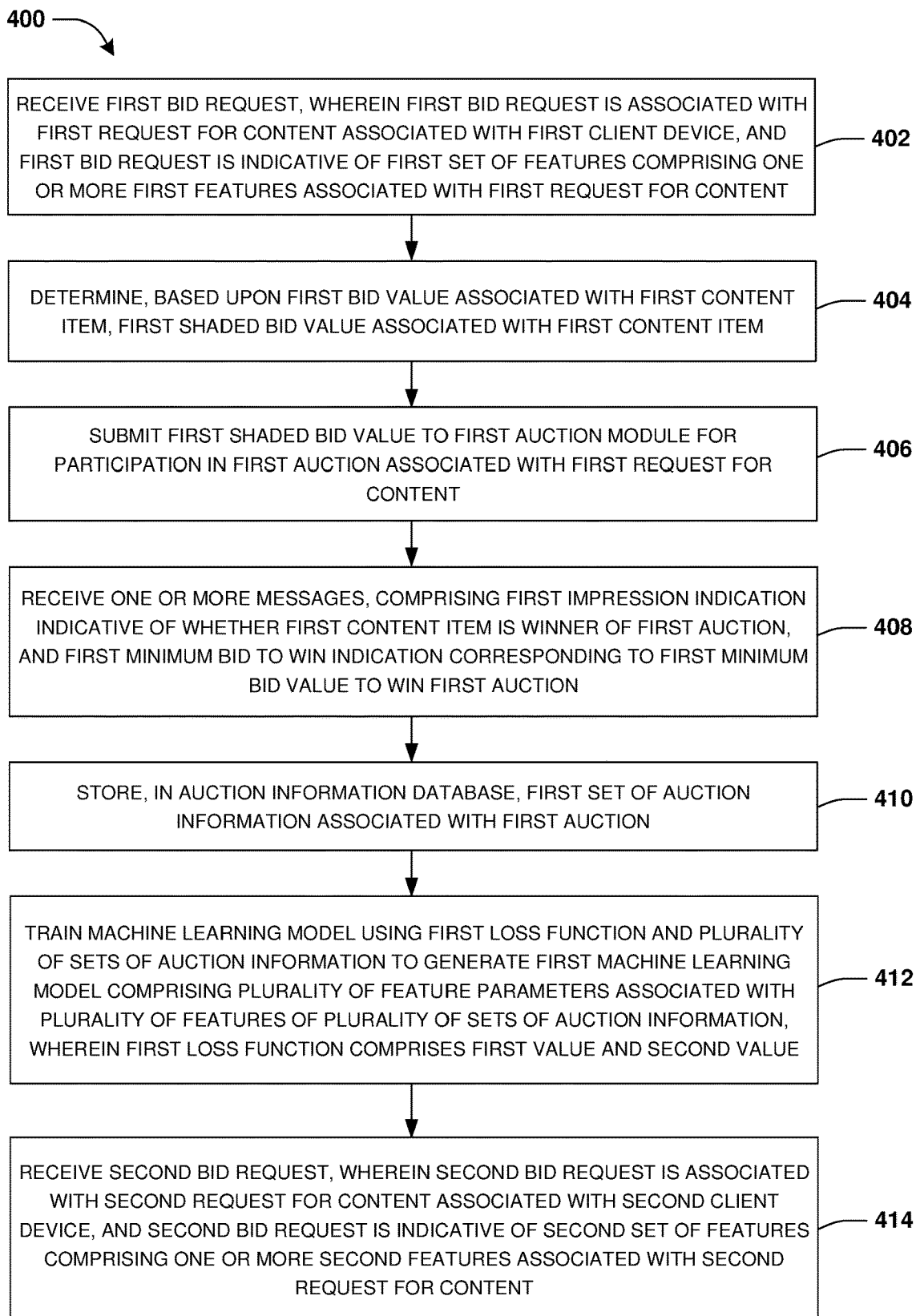
FIG. 4A is a first portion of a flow chart illustrating an example method for determining bid values for participation in auctions.
Figure 4B:
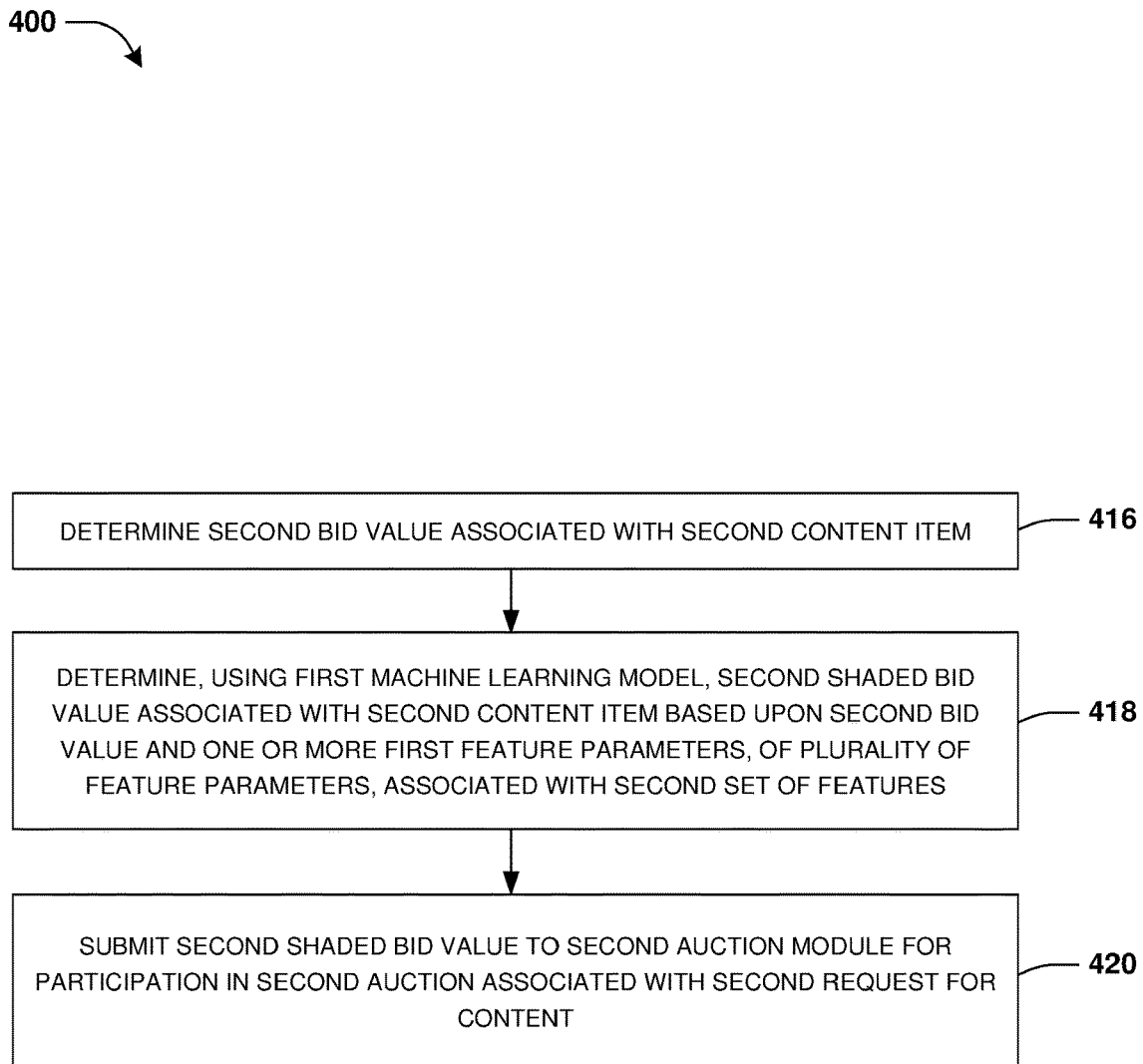
FIG. 4B is a second portion of a flow chart illustrating an example method for determining bid values for participation in auctions.

An embodiment of determining bid values for participation in auctions is illustrated by an example method 400 of FIGS. 4A-4B. In some examples, an entity may access and/or interact with a service, such as an advertising service, that provides a platform for uploading content to be presented via client devices to a content system. In some examples, the content system may be an advertisement system. Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application (e.g., a mobile application) associated with the content system and/or within a game associated with the content system. Alternatively and/or additionally, a user may be required to watch and/or interact with the content item before the user can access content of a web page, utilize resources of an application and/or play a game.

In some examples, a first content item may be received from a client device associated with a first entity. In some examples, the first entity may be an advertiser, a company, a brand, an organization, etc. Alternatively and/or additionally, the first content item may comprise at least one of an image, a video, audio, an interactive graphical object, etc. In some examples, the first content item may be an advertisement associated with the first entity (e.g., the advertisement may be used to promote one or more products, one or more services, etc. provided by the first entity).

Content information associated with the first content item and/or the first entity may be received. For example, the content information may comprise at least one of a budget associated with the first content item, a duration of time for which the first content item will be presented by the content system, a first target audience associated with the first content item, one or more advertisement campaign goals associated with the first content item (e.g., whether the entity is interested in clicks, conversions, and/or other interactions with respect to the content item, and/or a desired quantity of clicks, conversions, impressions, and/or other interactions with respect to the content item), a first content item bid value associated with the first content item, etc. In some examples, the budget may correspond to a budget to be spent during a period of time such as during a period of 24 hours.

A first user, such as user Jill, (and/or a first client device associated with the first user) may access and/or interact with a service, such as a browser, software, a website, an application, an operating system, an email interface, a messaging interface, a music-streaming application, a video application, a news application, etc. that provides a platform for viewing and/or downloading content from a server associated with the content system. In some examples, the content system may use user information, such as a first user profile comprising activity information (e.g., search history information, website browsing history, email information, selected content items, etc.), demographic information associated with the first user, location information, etc. to determine interests of the first user and/or select content for presentation to the first user based upon the interests of the first user.

At 402, a first bid request may be received. In some examples, the first bid request is associated with a first request for content associated with the first client device. The first request for content may correspond to a request to be provided with one or more content items (e.g., advertisements, images, links, videos, etc.) for presentation via a first internet resource, such as in one or more serving areas of the first internet resource. The first internet resource corresponds to at least one of a web page of a website associated with the content system, an application associated with the content system, an internet game associated with the content system, etc.

In some examples, the first client device may transmit a request to access the first internet resource to a first server associated with the first internet resource. Responsive to receiving the request to access the first internet resource, the first server associated with the first internet resource may transmit first resource information associated with the first internet resource to the first client device. The first client device may transmit the first request for content to the content system responsive to receiving the first resource information. Alternatively and/or additionally, the first server associated with the first internet resource may transmit the first request for content to the content system responsive to receiving the request to access the first internet resource.

The first request for content may be received by a supply-side server and/or a content exchange (e.g., an ad exchange). The supply-side server may be associated with a supply-side platform (SSP) associated with the content system. The supply-side server and/or the content exchange may transmit the first bid request to a demand-side platform (DSP). The first bid request may correspond to a request for one or more bid values for participation in a first auction associated with the first request for content.

In some examples, the first bid request is indicative of a first set of features. The first set of features comprises one or more first features associated with the first request for content, the first internet resource and/or the first client device. In an example, the first set of features comprises at least one of the first internet resource associated with the first request for content, a domain name of the first internet resource, a top-level domain associated with the first internet resource, at least some of a web address of the first internet resource, etc. Alternatively and/or additionally, the first set of features may comprise a first time of day associated with the first request for content. The first time of day may correspond to a current time of day and/or a time of day of transmission of the first request for content. In some examples, the first time of day may correspond to a local time of day, such as a time of day at a first location associated with the first client device. Alternatively and/or additionally, the first set of features may comprise a first day of week (e.g., a local day of week associated with the first location) associated with the first request for content. Alternatively and/or additionally, the first set of features may comprise the first location associated with the first client device (e.g., at least one of a region, a state, a province, a country, etc. associated with the first client device). Alternatively and/or additionally, the first set of features may comprise information associated with the first client device, such as an indication of the first client device (such as at least one of a device identifier associated with the first client device, an IP address associated with the first client device, a carrier identifier indicative of carrier information associated with the first client device, a user identifier (e.g., at least one of a username associated with a first user account associated with the first client device, an email address, a user account identifier, etc.) associated with the first client device, a browser cookie, etc.).

In some examples, a first bid value associated with the first content item may be determined. The first bid value may be determined based upon the content information associated with the first content item and/or the first entity, such as at least one of the budget associated with the first content item, the first target audience associated with the first content item, the one or more advertisement campaign goals associated with the first content item, the first content item bid value associated with the first content item, etc.

Alternatively and/or additionally, the first bid value may be determined based upon a first click probability associated with the first content item. In some examples, the first click probability corresponds to a probability of receiving a selection of the first content item responsive to presenting the first content item via the first client device. Alternatively and/or additionally, the first click probability may correspond to a probability of receiving a positive signal responsive to presenting the first content item via the first client device. For example, the positive signal may be indicative of the first content item being consumed by the first user. Alternatively and/or additionally, the positive signal may be indicative of one or more user interactions with the first content item. Alternatively and/or additionally, the positive signal may be indicative of the first content item being presented (and/or the first content item being presented for longer than a threshold duration of time) via the first client device.

Alternatively and/or additionally, the first bid value may be determined based upon a first conversion probability associated with the first content item. The first conversion probability may correspond to a probability of the first client device performing a conversion event associated with the first content item (e.g., purchasing a product and/or a service advertised by the first content item) after the first content item is presented via the first client device.

In some examples, the first click probability and/or the first conversion probability may be determined based upon the first user profile associated with the first client device and/or the content information associated with the first content item and/or the first entity. For example, the first request for content and/or the first bid request may comprise an indication of the first client device, such as at least one of the device identifier associated with the first client device, the IP address associated with the first client device, the carrier identifier associated with the first client device, the user identifier associated with the first client device, the browser cookie, etc. Responsive to receiving the first bid request, a user profile database comprising a plurality of user profiles may be analyzed based upon the indication of the first client device to identify the first user profile associated with the first client device. The first user profile may be identified based upon a determination that the indication of the first client device in the first request for content and/or the first bid request matches device identification information indicated by the first user profile.

The first bid value may correspond to a value of presenting the first content item via the first client device, such as determined based upon at least one of the first click probability, an amount of revenue (such as received by the first entity and/or one or more other entities) associated with receiving a selection of the first content item via the first client device, the first conversion probability, an amount of revenue associated with the first client device performing a conversion event associated with the first content item, etc. In an example where the first click probability is 10% and/or the amount of revenue associated with receiving a selection of the first content item via the first client device is $50.00, the first bid value may correspond to a combination of the first click probability and/or the amount of revenue (e.g., the first bid value may correspond to 10%×$50.00=$5.00). In an example where the first conversion probability is 1% and/or the amount of revenue associated with the first client device performing a conversion event associated with the first content item is $500.00, the first bid value may correspond to a combination of the first conversion probability and/or the amount of revenue (e.g., the first bid value may correspond to 1%×$500.00=$5.00). In some examples, the first bid value may correspond to an unshaded bid value. In some examples, such as where the first auction is a first-price auction, the first bid value may correspond to a bid value that is used if the first auction is a second-price auction.

At 404, a first shaded bid value associated with the first content item may be determined based upon the first bid value associated with the first content item. The first shaded bid value is less than the first bid value and/or does not exceed the first bid value. In some examples, a first bid reduction factor associated with reducing the first bid value to the first shaded bid value is determined. The first bid reduction factor may be applied to the first bid value to determine the first shaded bid value. For example, one or more operations (e.g., mathematical operations) may be performed using the first bid value and the first bid reduction factor to determine the first shaded bid value. In an example, the first bid reduction factor does not exceed 1 and the first bid value is multiplied by the first bid reduction factor to determine the first shaded bid value. In an example, the first bid reduction factor is equal to 0.8, the first bid value is equal to $5.00 and/or the first bid reduction factor is applied to the first bid value by multiplying the first bid reduction value by the first bid value to determine the first shaded bid value equal to 0.8×$5.00=$4.00. The first shaded bid value and/or the first bid reduction factor may be determined using one or more of the techniques described below.

At 406, the first shaded bid value is submitted to a first auction module for participation in the first auction associated with the first request for content. In some examples, the first auction module corresponds to the SSP and/or the content exchange. Accordingly, the first shaded bid value may be submitted to the first auction module by transmitting the first shaded bid value to the SSP and/or the content exchange. In some examples, the first shaded bid value is submitted to the first auction module in accordance with one or more specifications associated with the first auction module and/or the first auction. In an example, the one or more specifications may include a time window within which the first shaded bid value should be submitted after receiving the first bid request, such as at least one of 10 milliseconds, 20 milliseconds, etc. Thus, the first shaded bid value is determined and/or submitted within the time window after receiving the first bid request.

At 408, one or more messages are received. The one or more messages comprise a first impression indication and/or a first minimum bid to win indication. In some examples, the first impression indication and/or the first minimum bid to win indication are received in a single message of the one or more messages. Alternatively and/or additionally, the first impression indication is received in a first message and/or the first minimum bid to win indication is received in a second message separate from the first message. For example, the first message may be received from the first client device and/or a server associated with the first internet resource (and/or a different server). The first client device and/or the server associated with the first internet resource (and/or a different server) may transmit the first message responsive to determining that the first content item is presented via the first client device. In some examples, the second message may be received from the SSP and/or the content exchange after the first auction is performed.

The first impression indication is indicative of whether the first content item is presented via the first client device, and thus, may be indicative of whether the first content item is a winner of the first auction (e.g., the first content item is presented via the first client device and/or the first internet resource if the first content item wins the first auction).

The first minimum bid to win indication corresponds to a first minimum bid value to win the first auction. The first minimum bid to win may correspond to a highest bid value of a plurality of bid values participating in the first auction. Alternatively and/or additionally, in an example where the first shaded bid value is the highest bid value of the plurality of bid values (and the first content item wins the first auction, for example), the first minimum bid value to win may correspond to a second-highest bid value of the plurality of bid values. Alternatively and/or additionally, in the example where the first shaded bid value is the highest bid value of the plurality of bid values, the first minimum bid value to win may correspond to the first shaded bid value.

At 410, a first set of auction information associated with the first auction is stored in an auction information database. The first set of auction information is indicative of the first set of features, the first impression indication, the first bid value, the first shaded bid value and/or the first minimum bid value to win. In some examples, the auction information database comprises a plurality of sets of auction information, comprising the first set of auction information, associated with a plurality of auctions comprising the first auction. For example, a set of auction information of the plurality of sets of auction information (and/or each set of auction information of the plurality of sets of auction information) is associated with an auction of the plurality of auctions and/or comprises a set of features associated with the auction, a bid value determined responsive to receiving a bid request associated with the auction, a shaded bid value submitted for participation in the auction, a minimum bid value to win the auction and/or an impression indication indicative of whether the shaded bid value and/or a content item associated with the shaded bid value is a winner of the auction.

At 412, a machine learning model is trained using a first loss function and/or the plurality of sets of auction information to generate a first machine learning model. The first machine learning model comprises a first plurality of feature parameters associated with a first plurality of features of the plurality of sets of auction information. The first plurality of features may comprise at least some of the first set of features of the first set of auction information and/or other features indicated by sets of auction information, of the plurality of sets of auction information, other than the first set of auction information. Alternatively and/or additionally, the first machine learning model may comprise a bias parameter, such as comprising a bias weight.

In some examples, a first plurality of values may be determined based upon the plurality of sets of auction information. In some examples, the first plurality of values corresponds to a plurality of minimum bid values to win indicated by the plurality of sets of auction information. For example, a value of the first plurality of values (and/or each value of the first plurality of values) may correspond to a minimum bid value to win, associated with an auction of the plurality of auctions, indicated by a set of auction information of the plurality of sets of auction information. In an example, a first value of the first plurality of values may be associated with the first auction, and may correspond to the first minimum bid value to win indicated by the first set of auction information.

Alternatively and/or additionally, the first plurality of values may correspond to a plurality of optimal bid reduction factors associated with the plurality of auctions. For example, a value of the first plurality of values (and/or each value of the first plurality of values) may correspond to an optimal bid reduction factor associated with an auction of the plurality of auctions. In an example, the first value of the first plurality of values may correspond to a first optimal bid reduction factor associated with the first auction. The first optimal bid reduction factor may correspond to a bid reduction factor that yields the first minimum bid value to win (and/or a bid value higher than the first minimum bid value to win) when applied to the first bid value. The first optimal bid reduction factor may be determined based upon the first bid value and/or the first minimum bid value to win. One or more operations (e.g., mathematical operations) may be performed using the first bid value and/or the first minimum bid value to win to determine the first optimal bid reduction factor. In an example where the first bid value is equal to $5.00 and the first minimum bid value to win is equal to $3.00, the first optimal bid reduction factor may be equal to 0.6 (e.g., the first optimal bid reduction factor may be determined by dividing the first minimum bid value to win by the first bid value, i.e., $$\frac{\$3.00}{\$5.00} = 0.6\bigg).$$

In some examples, a second plurality of values may be determined based upon the plurality of sets of auction information. In some examples, the second plurality of values corresponds to a plurality of shaded bid values indicated by the plurality of sets of auction information. For example, a value of the second plurality of values (and/or each value of the second plurality of values) may correspond to a shaded bid value, associated with an auction of the plurality of auctions, indicated by a set of auction information of the plurality of sets of auction information. In an example, a second value of the second plurality of values may be associated with the first auction, and may correspond to the first shaded bid value indicated by the first set of auction information.

Alternatively and/or additionally, the second plurality of values may correspond to a plurality of bid reduction factors associated with the plurality of auctions. For example, a value of the second plurality of values (and/or each value of the second plurality of values) may correspond to a bid reduction factor, indicated by a set of auction information of the plurality of sets of auction information, applied to a bid value to determine a shaded bid value for participation in an auction of the plurality of auctions. In an example, the second value of the second plurality of values may correspond to the first bid reduction factor associated with the first auction.

In some examples, a plurality of differences may be determined based upon the first plurality of values and the second plurality of values. In an example, a difference of the plurality of differences (and/or each difference of the plurality of differences) corresponds to a difference between a value, associated with an auction of the plurality of auctions, of the first plurality of values and a value, associated with the auction, of the second plurality of values. For example, a first difference of the plurality of differences may be associated with the first auction, and may correspond to a difference between the first value, associated with the first auction, and the second value associated with the first auction. In an example where the first plurality of values corresponds to the plurality of minimum bid values to win and/or the second plurality of values corresponds to the plurality of shaded bid values, the first difference may correspond to a difference between the first minimum bid value to win and the first shaded bid value (e.g., the first minimum bid value to win may be equal to $3.00, the first shaded bid value may be equal to $4.00, and/or the first difference may be equal to $4.00−$3.00=$1.00). In an example where the first plurality of values corresponds to the plurality of optimal bid reduction factors and/or the second plurality of values corresponds to the plurality of bid reduction factors, the first difference may correspond to a difference between the first optimal bid reduction factor and the first bid reduction factor (e.g., the first optimal bid reduction factor may be equal to 0.6, the first bid reduction factor may be equal to 0.8, and/or the first difference may be equal to 0.8−0.6=0.2).

In some examples, the first plurality of feature parameters associated with the first plurality of features and/or the bias parameter may be generated based upon the plurality of differences, such as by performing the machine learning model training of act 412 to generate the first machine learning model. Alternatively and/or additionally, the first plurality of feature parameters and/or the bias parameter may be generated based upon the plurality of differences and/or the plurality of sets of auction information using one or more techniques other than machine learning model training.

In some examples, the machine learning model training may be performed and/or the first plurality of feature parameters and/or the bias parameter may be generated using the first loss function, which is used to determine loss values associated with the plurality of auctions based upon the plurality of differences.

In an example, a first loss value associated with the first auction is determined using the first loss function. The first loss function comprises the first value of the first plurality of values and the second value of the second plurality of values. The first loss function comprises determining the first difference (between the first value and the second value) associated with the first auction, and/or generating the first loss value based upon the first difference.

In some examples where the first plurality of values corresponds to the plurality of optimal bid reduction factors and/or the second plurality of values corresponds to the plurality of bid reduction factors, the first loss function comprises the first optimal bid reduction factor associated with the first auction and/or the first bid reduction factor associated with the first auction. In an example, the first loss function comprises $(y_i - \Phi_i)^2$, where $y_i$ corresponds to the first optimal bid reduction factor, $\Phi_i$ corresponds to the first bid reduction factor, and/or $y_i - \Phi_i$ corresponds to the first difference between the first optimal bid reduction factor and the first bid reduction factor. In some examples, the first loss value may correspond to $(y_i - \Phi_i)^2$.

In some examples, the first loss function is an asymmetrical loss function, where the same absolute value of the first difference can result in different values of the first loss value depending on one or more factors associated with the first auction. For example, the first loss value is greater if the first optimal bid reduction factor exceeds the first bid reduction factor by the first difference than if the first optimal bid reduction factor is less than the first bid reduction factor by the first difference. Alternatively and/or additionally, the first loss value is greater if the first bid value exceeds the first minimum bid value to win by a second difference than if the first bid value exceeds the first minimum bid value to win by a third difference that is less than the second difference. Alternatively and/or additionally, the first loss value is greater if the first minimum bid value to win exceeds the first shaded bid value by a fourth difference than if the first minimum bid value to win is less than the first shaded bid value by the fourth difference. In an example, the first loss function comprises $(y_i - \Phi_i)^2 \times |s_i|$, where $y_i$ corresponds to the first optimal bid reduction factor, $\Phi_i$ corresponds to the first bid reduction factor, and/or $y_i - \Phi_i$ corresponds to the first difference. $s_i$ corresponds to $1+\alpha$ if the first content item is not a winner of the first auction (and/or if the first optimal bid reduction factor exceeds the first bid reduction factor). $s_i$ corresponds to $1-\alpha$ if the first content item is a winner of the first auction (and/or if the first optimal bid reduction factor is less than the first bid reduction factor). In some examples, $\alpha$ is a constant. Alternatively and/or additionally, $\alpha$ may be based upon a difference between the first bid value and the first minimum bid value to win. In some examples, $\alpha=\min(1, \max(\text{optimal surplus}, \gamma))$, where optimal surplus=first bid value−first minimum bid value to win. In some examples, $\gamma$ corresponds to a capping value for $\alpha$. $\gamma$ may be a hyperparameter to afford manual control over the first loss function and/or the first machine learning model. In some examples, $\gamma \in (0,1)$. The first loss value may correspond to $(y_i - \Phi_i)^2 \times |s_i|$.

In some examples where the first plurality of values corresponds to the plurality of minimum bid values to win and/or the second plurality of values corresponds to the plurality of shaded bid values, the first loss function comprises the first minimum bid value to win associated with the first auction and/or the first shaded bid value associated with the first auction. For example, the first loss value may be determined based upon the first minimum bid value to win and the first shaded bid value (such as based upon the first difference between the first minimum bid value to win and the first shaded bid value). One or more operations (e.g., mathematical operations) may be performed using the first minimum bid value to win and/or the first shaded bid value to determine the first loss value.

In some examples, a first plurality of loss values may be determined using the first loss function. For example, the first plurality of loss values may comprise the first loss value associated with the first auction and other loss values associated with auctions, of the plurality of auctions, other than the first auction. The other loss values may be determined using one or more of the techniques described herein with respect to determining the first loss value associated with the first auction.

In some examples, a combined loss value may be determined based upon the first plurality of loss values. For example, the first loss function comprises determining a combined loss value using the first plurality of loss values. In some examples, one or more operations (e.g., mathematical operations) may be performed using the first plurality of loss values to determine the combined loss value. In an example, the combined loss value may correspond to an average of the first plurality of loss values. For example, the first loss function may comprise $$\frac{1}{N}\sum_{i=1}^{N} [\text{loss value}_i],$$

where N is equal to a quantity of the plurality of auctions, i corresponds to an auction index associated with the plurality of auctions, and/or loss value$_i$ corresponds to a loss value, of the first plurality of loss values, associated with an auction corresponding to the auction index. The combined loss value may correspond to $$\frac{1}{N} \sum_{i=1}^{N} [\text{loss value}_i].$$

The first loss function may be used to generate and/or adjust the first plurality of feature parameters and/or the bias parameter associated with the first plurality of features (in order to optimize the first machine learning model, for example). The first plurality of feature parameters and/or the bias parameter may be generated and/or adjusted based upon the plurality of sets of auction information, the combined loss value and/or the first plurality of loss values.

In some examples, the first machine learning model is configured to output a bid reduction factor and/or a shaded bid value based upon an input comprising at least one of a set of features associated with an auction (e.g., the first set of features associated with the first auction), a bid value determined responsive to receiving a bid request associated with the auction (e.g., the first bid value determined responsive to receiving the first bid request), etc. Optimizing the first machine learning model (and/or generating and/or adjusting the first plurality of feature parameters and/or the bias parameter) using the first loss function provides for an improvement to the first machine learning model such that bid reduction factors and/or shaded bid values output by the first machine learning model result in at least one of an increased bid surplus associated with a second plurality of auctions for which shaded bid values are determined using the first machine learning model, an increased quantity of auctions, of the second plurality of auctions, that are won using shaded bid values determined using the first machine learning model, etc.

In some examples, the first plurality of feature parameters may comprise a first plurality of weights associated with the first plurality of features and/or a first plurality of vector representations of the first plurality of features. For example, a first feature parameter of the first plurality of feature parameters may be associated with a first feature of the plurality of features, and may comprise a first weight associated with the first feature and/or a first vector representation of the first feature. In some examples, one, some and/or all of the first plurality of vector representations comprise K-dimensional vectors. In some examples, K is at most 100, such as 10, 20, or a different quantity of dimensions.

In some examples, the first machine learning model is generated by training one or more models, such as a factorization machine model and/or a different type of model, using the plurality of sets of auction information, the first loss function, the combined loss value and/or the first plurality of loss values. For example, a bid reduction factor model may be trained using the plurality of sets of auction information, the first loss function, the combined loss value and/or the first plurality of loss values to generate the first machine learning model with the first plurality of feature parameters and/or the bias parameter. In an example, the bid reduction factor model may comprise $\Phi = w_0 + \sum_{i=1}^{m} x_i w_i + \sum_{i=1}^{m} \sum_{j=i+1}^{m} x_i x_j \langle v_i, v_j \rangle$, where $w_0$ corresponds to the bias weight, where m corresponds to a quantity of features associated with an auction, i corresponds to a feature index, x corresponds to a feature associated with the auction, w corresponds to a weight (of a feature parameter) associated with the feature, v corresponds to a vector representation of a feature associated with the auction, and/or $\langle v_i, v_j \rangle$ corresponds to a dot product of a vector representation $v_i$ and a vector representation $v_j$. In some examples, $\Phi$ corresponds to a bid reduction factor. In some examples, the bid reduction factor model may be trained using the plurality of sets of auction information, the first loss function, the combined loss value and/or the first plurality of loss values to determine (e.g., learn) at least one of the first plurality of parameters (e.g., the first plurality of weights and/or the first plurality of vector representations), the bias parameter (e.g., the bias weight), etc.

FIGS. 5A-5G illustrate examples of a system 501 for determining bid values for participation in auctions, described with respect to the method 400 of FIGS. 4A-4B. A second user (and/or a second client device 500) may access and/or interact with a service, such as a browser, software, a website, an application, an operating system, an email interface, a messaging interface, a music-streaming application, a video application, etc. that provides a platform for accessing internet resources and/or viewing and/or downloading content from a server associated with the content system. In some examples, the content system may use user information, such as a second user profile comprising activity information (e.g., search history information, website browsing history, email information, selected content items, etc.), demographic information associated with the second user, location information, etc. to determine interests of the second user and/or select content for presentation to the second user based upon the interests of the second user.

Figure 5A:
FIG. 5A is a component block diagram illustrating an example system for determining bid values for participation in auctions, where a client device presents and/or accesses a first webpage using a browser of the client device.

FIG. 5A illustrates the second client device 500 presenting and/or accessing a first web page 508 using a browser of the second client device 500. The browser may comprise an address bar 502 comprising a web address (e.g., a uniform resource locator (URL)) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
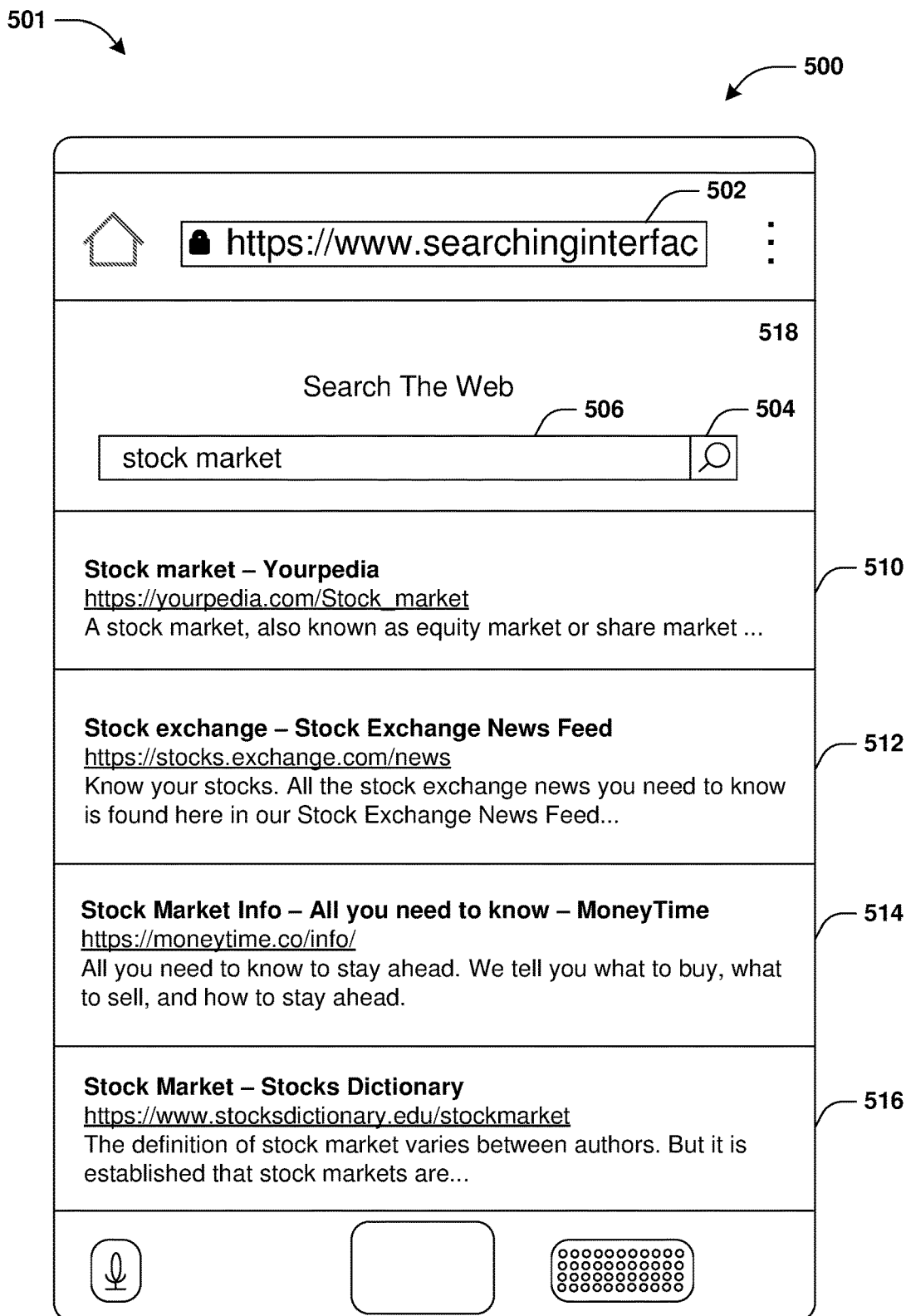
FIG. 5B is a component block diagram illustrating an example system for determining bid values for participation in auctions, where a client device presents a plurality of search results associated with a query using a browser of the client device.

FIG. 5B illustrates the second client device 500 presenting a plurality of search results associated with the query using the browser of the second client device 500. For example, the plurality of search results may be presented within a second web page 518. For example, the plurality of search results may comprise a first search result 510 corresponding to a third web page, a second search result 512 corresponding to a fourth web page 544 (illustrated in FIG. 5G), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 544 may be selected (e.g., the second search result 512 may be selected via a second selectable input corresponding to the second search result 512).

Figure 5C:
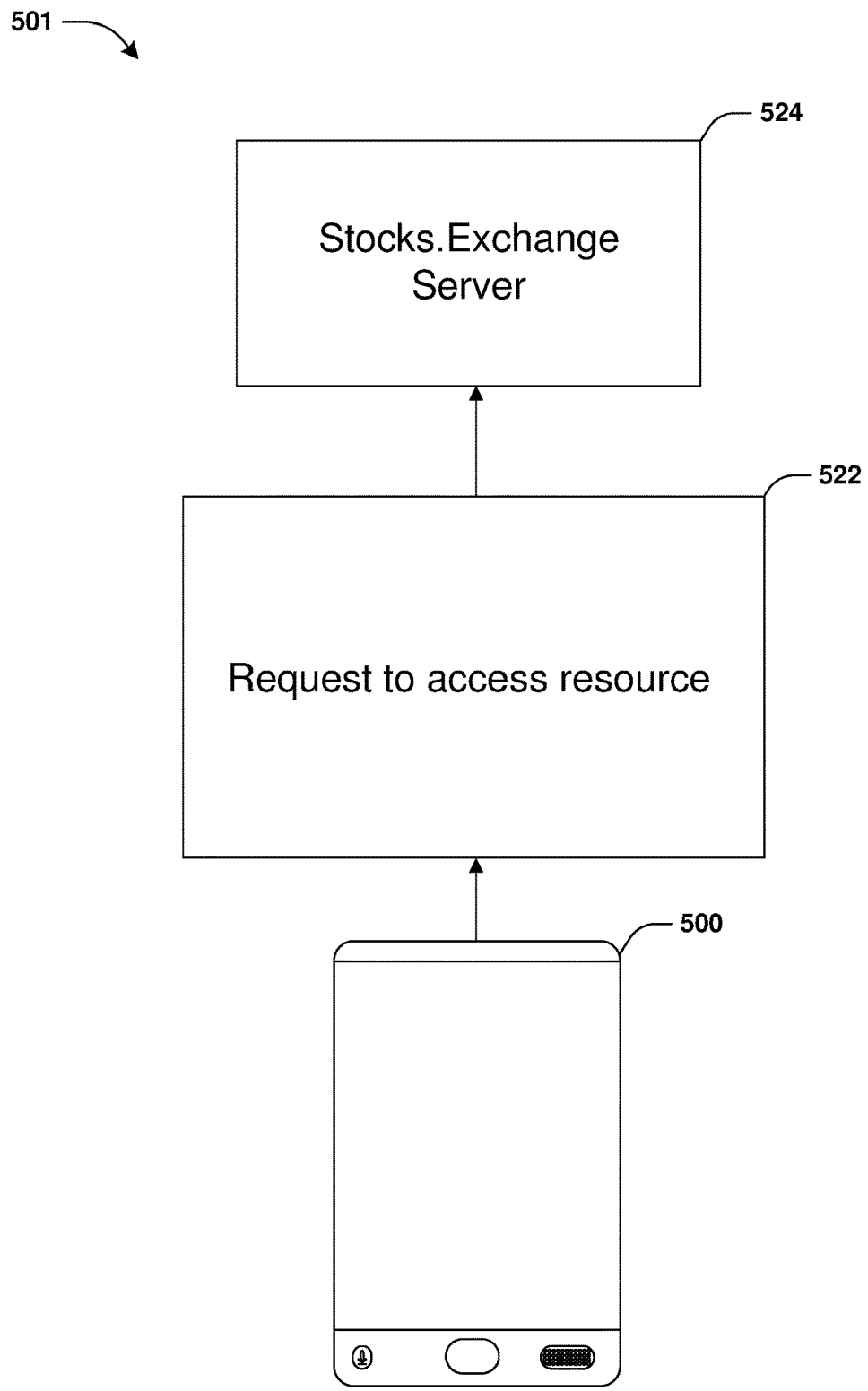
FIG. 5C is a component block diagram illustrating an example system for determining bid values for participation in auctions, where a client device transmits a request to access a resource to a server.

FIG. 5C illustrates the second client device 500 transmitting a request 522 to access a resource to a server 524. In some examples, the request 522 to access the resource may be transmitted responsive to the second search result 512 being selected. For example, the resource may correspond to the fourth web page 544. For example, the request 522 to access the resource may comprise an indication of the fourth web page 544 (e.g., a web address "https://stocks.exchange-.com/news"). Alternatively and/or additionally, the server 524 may be associated with the fourth web page 544.

Figure 5D:
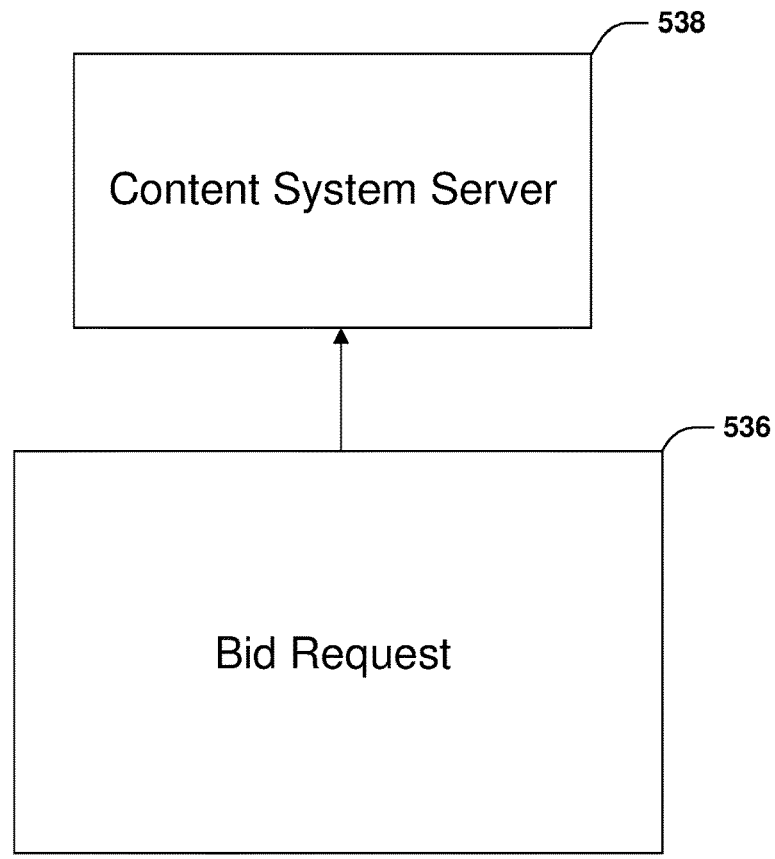
FIG. 5D is a component block diagram illustrating an example system for determining bid values for participation in auctions, where a bid request is received.

In some examples, responsive to receiving the request 522 to access the resource, the server 524 associated with the fourth web page 544 may transmit second resource information associated with the fourth web page 544 to the second client device 500. The second client device 500 may transmit a second request for content to the content system (such as to a second SSP and/or a second content exchange associated with the content system) responsive to receiving the second resource information. Alternatively and/or additionally, the server 524 associated with the fourth web page 544 may transmit the second request for content to the content system (such as to the second SSP and/or the second content exchange associated with the content system), responsive to receiving the request 522 to access the resource. In some examples, the second request for content may correspond to a request to be provided with one or more content items (e.g., advertisements, images, links, videos, etc.) for presentation via the fourth web page 544, such as in one or more serving areas of the fourth web page 544 (e.g., the one or more serving areas may comprise an upper portion of the fourth web page 544 as illustrated in FIG. 5G and/or a different portion of the fourth web page 544).

At 414, a second bid request is received. FIG. 5D illustrates reception of the second bid request (shown with reference number 536). The second bid request 536 may be received by a server 538 associated with the content system. For example, the server 538 may correspond to a DSP. In some examples, the second bid request 536 is associated with the second request for content associated with the second client device 500. The second bid request 536 may be received from the second SSP and/or the second content exchange associated with the content system. The second bid request 536 may correspond to a request for one or more bid values for participation in a second auction associated with the second request for content.

In some examples, the second bid request may be indicative of a second set of features. The second set of features comprises one or more second features associated with the second request for content, the fourth web page 544 and/or the second client device 500. In an example, the second set of features may comprise at least one of the fourth web page 544, a domain name of the fourth web page 544, a top-level domain associated with the fourth web page 544 (e.g., stocks.exchange.com), at least some of a web address of the fourth web page 544 (e.g., "https://stocks.exchange.com/news"), etc. Alternatively and/or additionally, the second set of features may comprise a second time of day associated with the second request for content. The second time of day may correspond to a current time of day and/or a time of day of transmission of the second request for content. In some examples, the second time of day may correspond to a local time of day, such as a time of day at a second location associated with the second client device 500. Alternatively and/or additionally, the second set of features may comprise a second day of week (e.g., a local day of week associated with the second location) associated with the second request for content. Alternatively and/or additionally, the second set of features may comprise the second location associated with the second client device 500 (e.g., at least one of a region, a state, a province, a country, etc. associated with the second client device 500). Alternatively and/or additionally, the second set of features may comprise information associated with the second client device 500, such as an indication of the second client device 500 (such as at least one of a device identifier associated with the second client device 500, an IP address associated with the second client device 500, a carrier identifier indicative of carrier information associated with the second client device 500, a user identifier (e.g., at least one of a username associated with a second user account associated with the second client device 500, an email address, a user account identifier, etc.) associated with the second client device 500, a browser cookie, etc.).

At 416, a second bid value associated with a second content item is determined. The second bid value may be determined based upon second content information associated with the second content item and/or a second entity associated with the second content item. In some examples, the second entity may be an advertiser, a company, a brand, an organization, etc. Alternatively and/or additionally, the second content item may comprise at least one of an image, a video, audio, an interactive graphical object, etc. In some examples, the second content item may be an advertisement associated with the second entity (e.g., the advertisement may be used to promote one or more products, one or more services, etc. provided by the second entity).

In some examples, the second bid value may be determined based upon at least one of a second budget associated with the second content item, a second target audience associated with the second content item, one or more second advertisement campaign goals associated with the second content item, a second content item bid value associated with the second content item received from the second entity, etc.

Alternatively and/or additionally, the second bid value may be determined based upon a second click probability associated with the second content item. In some examples, the second click probability corresponds to a probability of receiving a selection of the second content item responsive to presenting the second content item via the second client device 500. Alternatively and/or additionally, the second click probability may correspond to a probability of receiving a positive signal responsive to presenting the second content item via the second client device 500. For example, the positive signal may be indicative of the second content item being consumed by the second user. Alternatively and/or additionally, the positive signal may be indicative of one or more user interactions with the second content item. Alternatively and/or additionally, the positive signal may be indicative of the second content item being presented (and/or the second content item being presented for longer than a threshold duration of time) via the second client device 500.

Alternatively and/or additionally, the second bid value may be determined based upon a second conversion probability associated with the second content item. The second conversion probability may correspond to a probability of the second client device 500 performing a conversion event associated with the second content item (e.g., purchasing a product and/or a service advertised by the second content item) after the second content item is presented via the second client device 500.

In some examples, the second click probability and/or the second conversion probability may be determined based upon the second user profile associated with the second client device 500 and/or the second content information associated with the second content item and/or the second entity. For example, the second request for content and/or the second bid request may comprise an indication of the second client device 500, such as at least one of the device identifier associated with the second client device 500, the IP address associated with the second client device 500, the carrier identifier associated with the second client device 500, the user identifier associated with the second client device 500, a browser cookie, etc. Responsive to receiving the second bid request, the user profile database may be analyzed based upon the indication of the second client device 500 to identify the second user profile associated with the second client device 500. The second user profile may be identified based upon a determination that the indication of the second client device 500 in the second request for content and/or the second bid request matches device identification information indicated by the second user profile.

The second bid value may correspond to a value of presenting the second content item via the second client device 500, such as determined based upon at least one of the second click probability, an amount of revenue (such as received by the second entity and/or one or more other entities) associated with receiving a selection of the second content item via the second client device 500, the second conversion probability, an amount of revenue associated with the second client device 500 performing a conversion event associated with the second content item, etc. In some examples, the second bid value may correspond to an unshaded bid value. In some examples, such as where the second auction is a first-price auction, the second bid value may correspond to a bid value that is used if the second auction is a second-price auction.

At 418, a second shaded bid value associated with the second content item is determined using the first machine learning model based upon the second bid value, the bias parameter and/or one or more first feature parameters, of the first plurality of feature parameters, associated with the second set of features. In some examples, the first plurality of feature parameters may be analyzed based upon the second set of features to identify the one or more first feature parameters, from the first plurality of feature parameters, that are associated with the one or more second features of the second set of features. In some examples, the second shaded bid value may be determined based upon the second bid value, the bias parameter and/or the one or more first feature parameters using a non-machine learning function and/or a non-machine learning system.

In some examples, a second bid reduction factor associated with reducing the second bid value to the second shaded bid value is determined. In some examples, the second bid reduction factor is determined using the one or more first feature parameters associated with the second set of features. For example, the second bid reduction factor may be determined using one or more first weights of the one or more first feature parameters and/or one or more first vector representations of the one or more first feature parameters. For example, a feature parameter of the one or more first feature parameters (and/or each feature parameter of the one or more first feature parameters) may be indicative of a weight of the one or more first weights and/or a vector representation of the one or more first vector representations.

In some examples, the bid reduction factor model may be used to determine the second bid reduction factor and/or the second shaded bid value. Linear regression may be performed using the one or more first weights to determine a third value. The third value may correspond to $\Sigma_{i=1}^{m} x_i w_i$, where m corresponds to a quantity of the one or more second features of the second set of features, i corresponds to a feature index, x corresponds to a feature of the second set of features, and/or w corresponds to a weight, of the one or more first weights, associated with the feature. Accordingly, the third value may be determined by determining one or more products, where each product of the one or more products is a product of a feature of the second set of features and a weight (of the one or more first weights) associated with the feature, and/or combining (e.g., summing) the one or more products. Alternatively and/or additionally, the third value may be determined by performing one or more other operations (e.g., mathematical operations) using the one or more second features and/or the one or more first weights.

In some examples, one or more interactions between pairs of features of the second set of features may be determined. In an example, the second set of features comprises three features feature A, feature B, and feature C. The one or more interactions may include an interaction between feature A and feature B, an interaction between feature A and feature C, and/or an interaction between feature B and feature C.

In some examples, the one or more interactions may comprise a first interaction between a second feature of the second set of features and a third feature of the second set of features. The first interaction may be determined based upon a second vector representation associated with the second feature and/or a third vector representation associated with the third feature. The second vector representation may be determined based upon a second feature parameter, of the one or more first feature parameters, associated with the second feature (e.g., the second feature parameter may be indicative of the second vector representation). The third vector representation may be determined based upon a third feature parameter, of the one or more first feature parameters, associated with the third feature. The first interaction may be determined by performing one or more operations (e.g., mathematical operations) using the second vector representation and/or the third vector representation. In an example, the first interaction may be determined by determining a dot product of the second vector representation and the third vector representation.

In some examples, the one or more interactions may comprise the first interaction between the second feature and the third feature and/or one or more other interactions between one or more other pairs of features of the second set of features. The one or more other interactions may be determined using one or more of the techniques described herein with respect to determining the first interaction.

A fourth value may be determined based upon the one or more interactions. For example, the fourth value may be determined by performing one or more operations (e.g., mathematical operations) using the one or more interactions. For example, the one or more interactions may be combined (e.g., summed) to determine the fourth value. In an example where an interaction, of the one or more interactions, between a pair of features is determined by determining a dot product of vector representations associated with the pair of features, the fourth value may correspond to $\Sigma_{i=1}^{m} \Sigma_{j=i+1}^{m} x_i x_j \langle v_i, v_j \rangle$, where m corresponds to a quantity of the one or more second features of the second set of features, i corresponds to a feature index, x corresponds to a feature of the second set of features, v corresponds to a vector representation of a feature of the second set of features, and/or $\langle v_i, v_j \rangle$ corresponds to a dot product of a vector representation $v_i$ and a vector representation $v_j$.

In some examples, the second bid reduction factor is determined based upon the third value and/or the fourth value. For example, the second bid reduction factor may be determined by performing one or more operations (e.g., mathematical operations) using the third value and/or the fourth value. For example, the third value and the fourth value may be combined (e.g., summed) to determine the second bid reduction factor.

In some examples, the second bid reduction factor is determined based upon the third value, the fourth value and/or a fifth value. The fifth value may correspond to the bias weight. The second bid reduction factor may be determined by performing one or more operations (e.g., mathematical operations) using the third value, the fourth value and/or the fifth value. For example, the third value, the fourth value and the fifth value may be combined (e.g., summed) to determine the second bid reduction factor.

In some examples, the second bid reduction value is applied to the second bid value to determine the second shaded bid value. For example, one or more operations (e.g., mathematical operations) may be performed using the second bid value and the second bid reduction factor to determine the second shaded bid value. In an example, the second bid reduction factor does not exceed 1 and the second bid value is multiplied by the second bid reduction factor to determine the second shaded bid value.

Figure 5E:
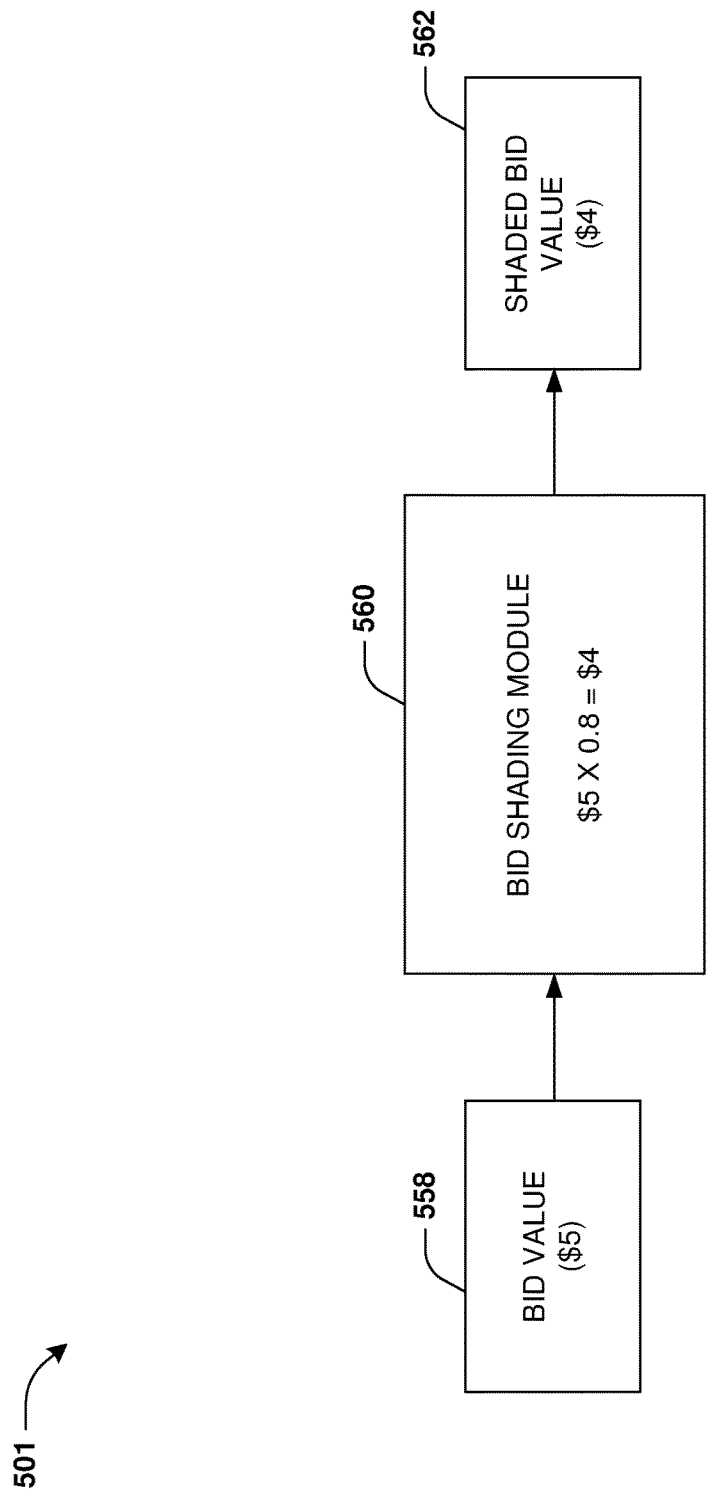
FIG. 5E is a component block diagram illustrating an example system for determining bid values for participation in auctions, where a shaded bid value is determined.

FIG. 5E illustrates the second shaded bid value (shown with reference number 562) being determined. For example, the second bid value (shown with reference number 558) may be input to a bid shading module 560. The bid shading module 560 may determine the second bid reduction factor using the first machine learning model, the second bid value, the bias parameter and/or the one or more first feature parameters. The second bid reduction factor may be applied to the second bid value 558 to determine the second shaded bid value 562. In an example, the second bid value 558 is equal to $5.00, the second bid reduction factor is equal to 0.8, and/or the second shaded bid value 562 is determined to be 0.8×$5.00=$4.00.

At 420, the second shaded bid value is submitted to a second auction module for participation in the second auction associated with the second request for content. In some examples, the second auction module corresponds to the second SSP and/or the second content exchange. Accordingly, the second shaded bid value may be submitted to the second auction module by transmitting the second shaded bid value to the second SSP and/or the second content exchange. The second auction module may be the same as the first auction module. Alternatively and/or additionally, the second auction module may be different than the first auction module.

Figure 5F:
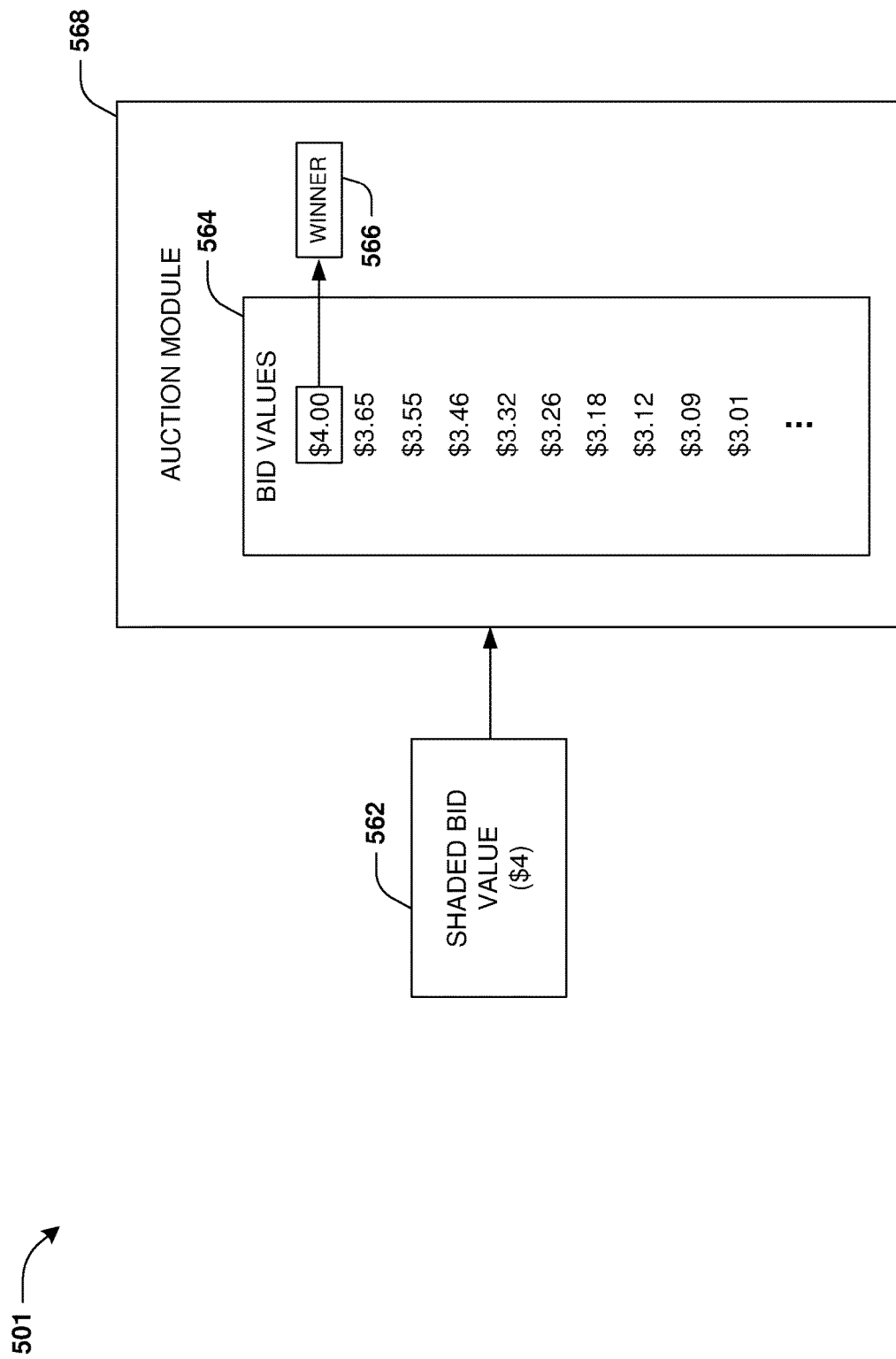
FIG. 5F is a component block diagram illustrating an example system for determining bid values for participation in auctions, where a shaded bid value is submitted to an auction module.
Figure 5G:
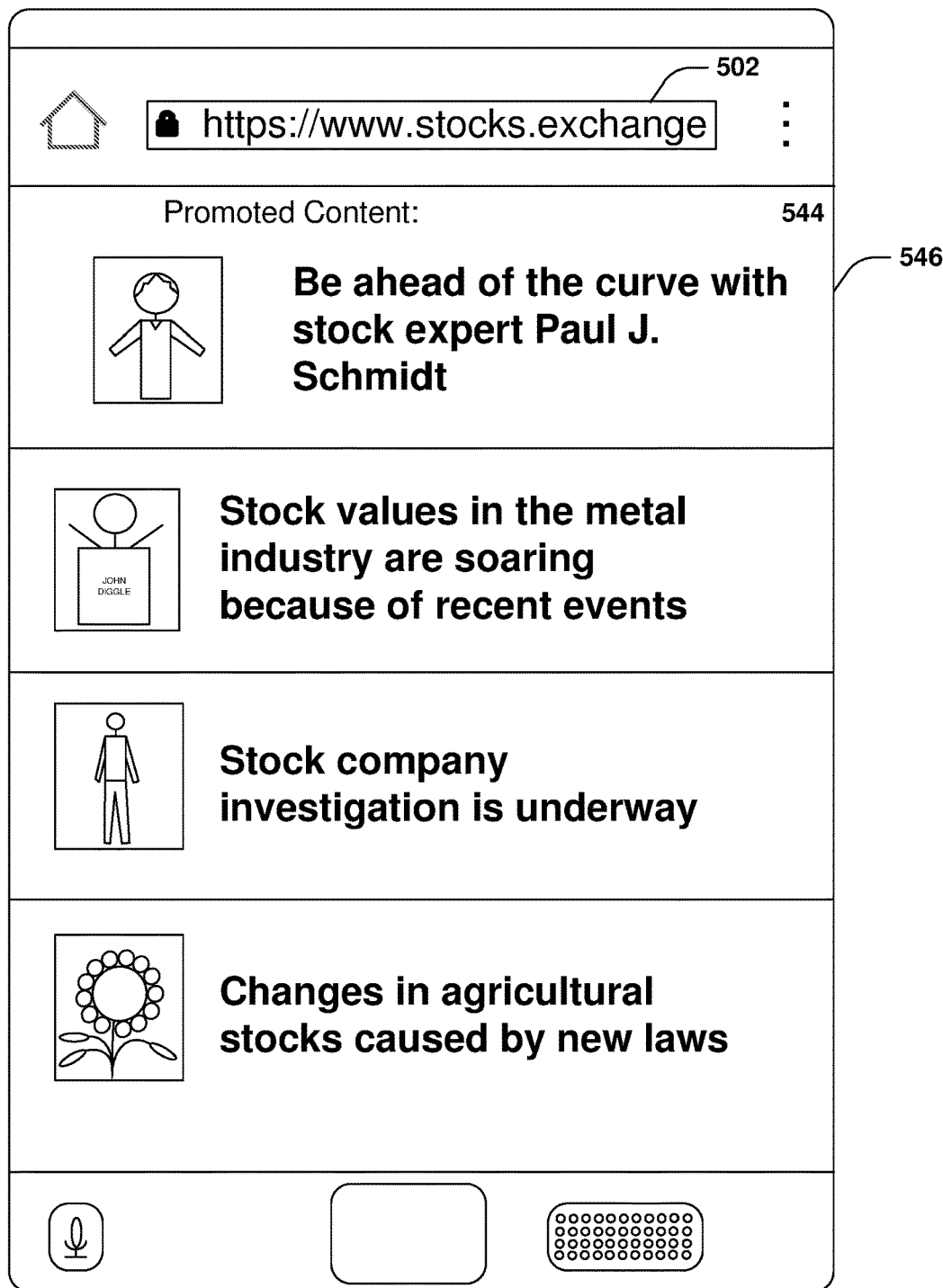
FIG. 5G is a component block diagram illustrating an example system for determining bid values for participation in auctions, where a client device presents and/or accesses a fourth webpage using a browser of the client device.

FIG. 5F illustrates the second shaded bid value 562 being submitted to the second auction module (shown with reference number 568). In some examples, the second auction module 568 may analyze a plurality of bid values 564 participating in the second auction to identify a winner 566 of the second auction. For example, the second auction module 568 may determine that the second shaded bid value 562 and/or the second content item associated with the second shaded bid value 562 are the winner 566 of the second auction based upon a determination that the second shaded bid value 562 is a highest bid value of the plurality of bid values 564.

In some examples, responsive to determining that the second shaded bid value 562 and/or the second content item associated with the second shaded bid value 562 are the winner 566 of the second auction, the second content item may be transmitted to the second client device 500. FIG. 5G illustrates the second client device 500 presenting and/or accessing the fourth web page 544 using the browser. For example, the content system may provide the second content item (shown with reference number 546) to be presented via the fourth web page 544 while the fourth web page 544 is accessed by the second client device 500.

Figure 6:
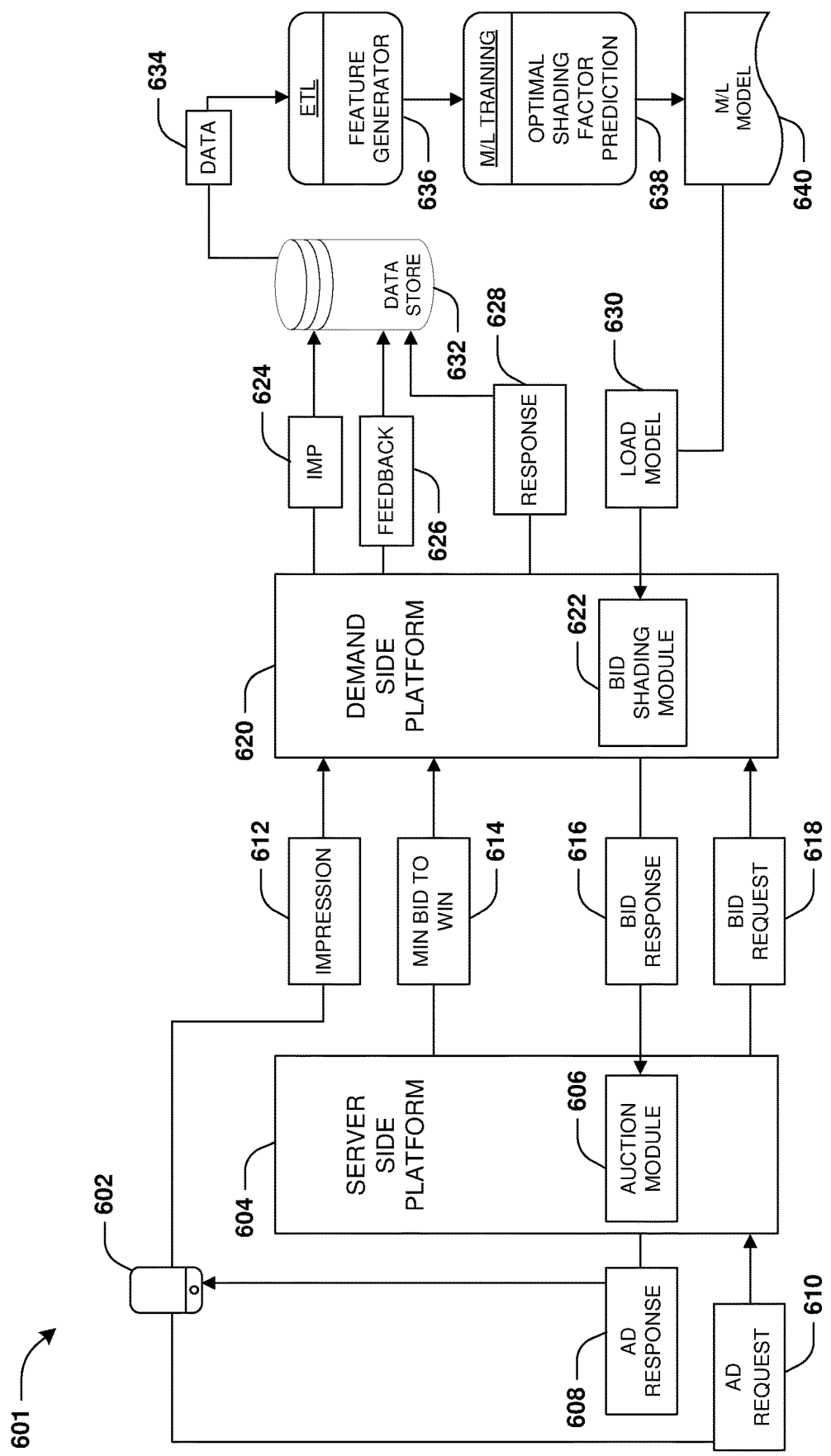
FIG. 6 is a component block diagram illustrating an example system for determining bid values for participation in auctions.

FIG. 6 illustrates an example of a system 601 for determining bid values for participation in auctions, described with respect to the method 400 of FIGS. 4A-4B. In some examples, an SSP 604 may receive a request for content 610 (e.g., an advertisement request) from a client device 602. Responsive to receiving the request for content 610, the SSP 604 may transmit a bid request 618 to a DSP 620. Responsive to receiving the bid request 618, the DSP 620 may submit a bid response 616 to an auction module 606 (such as the first auction module and/or the second auction module) of the SSP 604. The bid response 616 may comprise a bid value (e.g., a shaded bid value such as the first shaded bid value and/or the second shaded bid value) for participation in an auction associated with the request for content 610. In some examples, the auction module 606 determines a winner of the auction and/or transmits a response 608 to the client device 602 based upon the winner. In an example where a content item associated with the bid value is the winner of the auction, the content item may be presented via the client device 602 and/or an impression indication 612 (e.g., the first impression indication) may be transmitted to the DSP 620. The impression indication 612 may be indicative of the content item being presented via the client device 602. In some examples, the SSP 604 may transmit a minimum bid to win indication 614 (e.g., the first minimum bid to win indication) to the DSP 620. In some examples, a set of auction information (e.g., the first set of auction information) may be stored in a data store 632 (e.g., the auction information database). The set of auction information may comprise a second impression indication 624 (such as indicative of the impression indication 612), feedback 626 (such as indicative of a minimum bid value to win indicated by the first minimum bid to win indication), response information 628 (such as indicative of the bid response 616 and/or the bid value indicated by the bid response 616), and/or indications of one or more features (e.g., the one or more first features) associated with the request for content 610 and/or the bid request 618. Historical auction information (e.g., the plurality of sets of auction information) may be stored on the data store 632. Data 634 (e.g., the plurality of sets of auction information) from the data store 632 may be input to a module 636, such as an extraction transform and loading (ETL) module 636. The module 636 is configured to extract features from the data 634 and/or generate features based upon the data 634. Information, such as at least one of indications of features from the module 636, minimum bid values to win, bid values submitted to auction modules, etc. may be input to a machine learning training module 638 configured to generate a machine learning model 640 (e.g., the first machine learning model) with learned parameters (e.g., the first plurality of feature parameters and/or the bias parameter). The machine learning model 640 may be loaded 630 onto a bid shading module 622 of the DSP 620. The bid shading module 622 (and/or the machine learning model 640 with the learned parameters) may be used to determine shaded bid values for participation in auctions. In an example, responsive to receiving a second bid request, the DSP 620 may determine a bid value (e.g., an unshaded bid value). The bid value and/or one or more features associated with the second bid request may be input to the bid shading module 622. The bid shading module 622 may output a shaded bid value (using the machine learning model 640 with the learned parameters), such as using one or more techniques described herein with respect to determining the second shaded bid value.

Figure 7A:
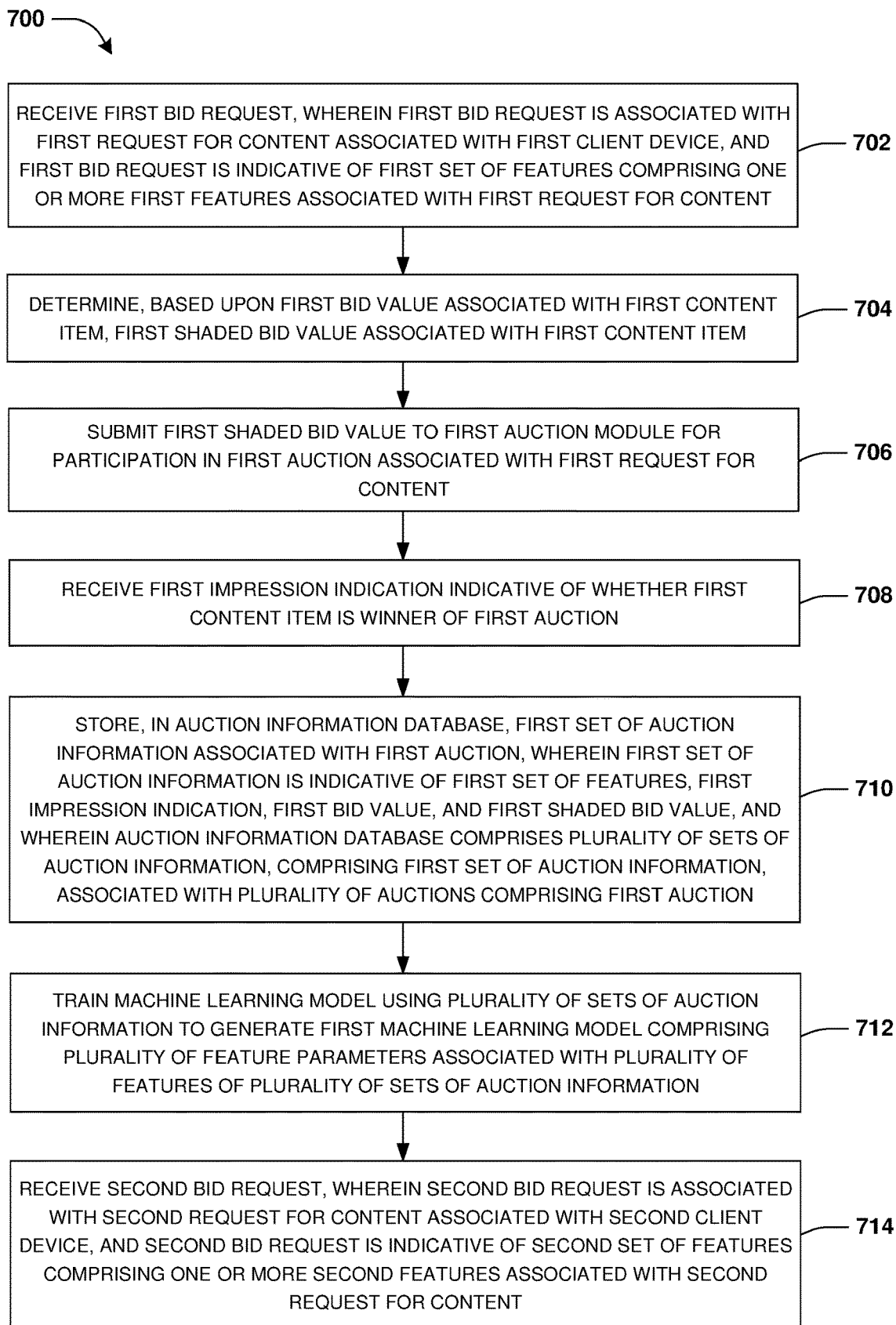
FIG. 7A is a first portion of a flow chart illustrating an example method for determining bid values for participation in auctions.
Figure 7B:
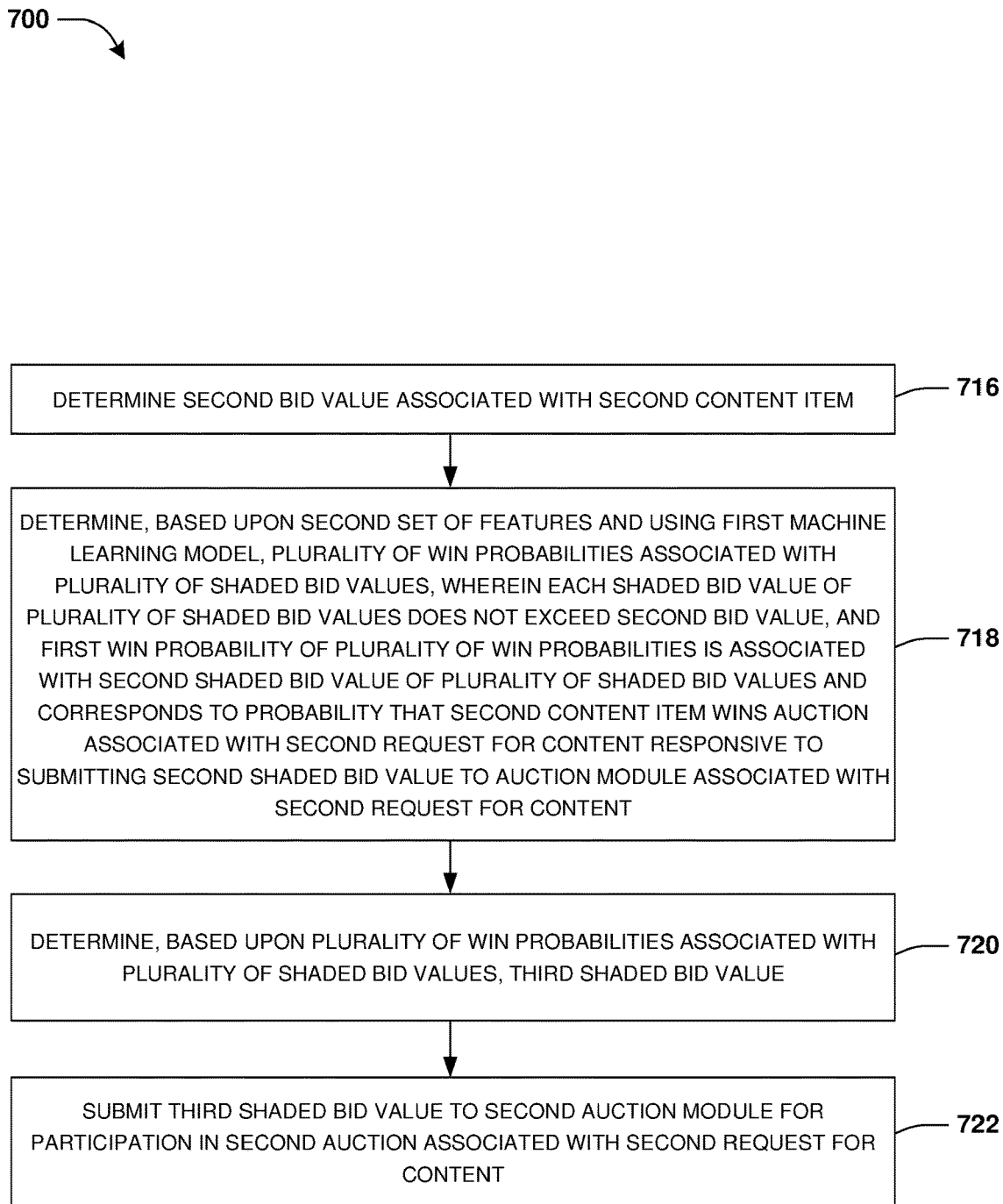
FIG. 7B is a second portion of a flow chart illustrating an example method for determining bid values for participation in auctions.

An embodiment of determining bid values for participation in auctions is illustrated by an example method 700 of FIGS. 7A-7B. In some examples, an entity may access and/or interact with a service, such as an advertising service, that provides a platform for uploading content to be presented via client devices to a content system, such as the content system described with respect to the method 400 of FIGS. 4A-4B.

In some examples, a first content item may be received from a client device associated with a first entity. In some examples, the first entity may be an advertiser, a company, a brand, an organization, etc. Alternatively and/or additionally, the first content item may comprise at least one of an image, a video, audio, an interactive graphical object, etc. In some examples, the first content item may be an advertisement associated with the first entity (e.g., the advertisement may be used to promote one or more products, one or more services, etc. provided by the first entity).

Content information associated with the first content item and/or the first entity may be received. For example, the content information may comprise at least one of a budget associated with the first content item, a duration of time for which the first content item will be presented by the content system, a first target audience associated with the first content item, one or more advertisement campaign goals associated with the first content item, a first content item bid value associated with the first content item, etc.

A first user, such as user John, (and/or a first client device associated with the first user) may access and/or interact with a service, such as a browser, software, a website, an application, an operating system, an email interface, a messaging interface, a music-streaming application, a video application, a news application, etc. that provides a platform for viewing and/or downloading content from a server associated with the content system. In some examples, the content system may use user information, such as a first user profile comprising activity information (e.g., search history information, website browsing history, email information, selected content items, etc.), demographic information associated with the first user, location information, etc. to determine interests of the first user and/or select content for presentation to the first user based upon the interests of the first user.

At 702, a first bid request may be received. In some examples, the first bid request is associated with a first request for content associated with the first client device. The first request for content may correspond to a request to be provided with one or more content items (e.g., advertisements, images, links, videos, etc.) for presentation via a first internet resource, such as in one or more serving areas of the first internet resource. The first internet resource corresponds to at least one of a web page of a website associated with the content system, an application associated with the content system, an internet game associated with the content system, etc.

In some examples, the first client device may transmit a request to access the first internet resource to a first server associated with the first internet resource. Responsive to receiving the request to access the first internet resource, the first server associated with the first internet resource may transmit first resource information associated with the first internet resource to the first client device. The first client device may transmit the first request for content to the content system responsive to receiving the first resource information. Alternatively and/or additionally, the first server associated with the first internet resource may transmit the first request for content to the content system responsive to receiving the request to access the first internet resource.

The first request for content may be received by a supply-side server and/or a content exchange (e.g., an ad exchange). The supply-side server may be associated with an SSP associated with the content system. The supply-side server and/or the content exchange may transmit the first bid request to a DSP. The first bid request may correspond to a request for one or more bid values for participation in a first auction associated with the first request for content.

In some examples, the first bid request is indicative of a first set of features. The first set of features comprises one or more first features associated with the first request for content, the first internet resource and/or the first client device. In an example, the first set of features comprises at least one of the first internet resource associated with the first request for content, a domain name of the first internet resource, a top-level domain associated with the first internet resource, at least some of a web address of the first internet resource, etc. Alternatively and/or additionally, the first set of features may comprise a first time of day associated with the first request for content. The first time of day may correspond to a current time of day and/or a time of day of transmission of the first request for content. In some examples, the first time of day may correspond to a local time of day, such as a time of day at a first location associated with the first client device. Alternatively and/or additionally, the first set of features may comprise a first day of week (e.g., a local day of week associated with the first location) associated with the first request for content. Alternatively and/or additionally, the first set of features may comprise the first location associated with the first client device (e.g., at least one of a region, a state, a province, a country, etc. associated with the first client device).

In some examples, a first bid value associated with the first content item may be determined. The first bid value may be determined based upon the content information associated with the first content item and/or the first entity, such as at least one of the budget associated with the first content item, the first target audience associated with the first content item, the one or more advertisement campaign goals associated with the first content item, the first content item bid value associated with the first content item, etc.

Alternatively and/or additionally, the first bid value may be determined based upon a first click probability associated with the first content item. In some examples, the first click probability corresponds to a probability of receiving a selection of the first content item responsive to presenting the first content item via the first client device. Alternatively and/or additionally, the first click probability may correspond to a probability of receiving a positive signal responsive to presenting the first content item via the first client device, such as described with respect to the method 400 of FIGS. 4A-4B.

Alternatively and/or additionally, the first bid value may be determined based upon a first conversion probability associated with the first content item. The first conversion probability may correspond to a probability of the first client device performing a conversion event associated with the first content item (e.g., purchasing a product and/or a service advertised by the first content item) after the first content item is presented via the first client device.

In some examples, the first click probability and/or the first conversion probability may be determined based upon the first user profile associated with the first client device and/or the content information associated with the first content item and/or the first entity, such as described with respect to the method 400 of FIGS. 4A-4B.

The first bid value may correspond to a value of presenting the first content item via the first client device such as determined based upon at least one of the first click probability, an amount of revenue (such as received by the first entity and/or one or more other entities) associated with receiving a selection of the first content item via the first client device, the first conversion probability, an amount of revenue associated with the first client device performing a conversion event associated with the first content item, etc. In some examples, the first bid value may correspond to an unshaded bid value. In some examples, such as where the first auction is a first-price auction, the first bid value may correspond to a bid value that is used if the first auction is a second-price auction.

At 704, a first shaded bid value associated with the first content item may be determined based upon the first bid value associated with the first content item. The first shaded bid value is less than the first bid value and/or does not exceed the first bid value. The first shaded bid value may be determined using one or more of the techniques described below.

At 706, the first shaded bid value is submitted to a first auction module for participation in the first auction associated with the first request for content. In some examples, the first auction module corresponds to the SSP and/or the content exchange. Accordingly, the first shaded bid value may be submitted to the first auction module by transmitting the first shaded bid value to the SSP and/or the content exchange. In some examples, the first shaded bid value is submitted to the first auction module in accordance with one or more specifications associated with the first auction module and/or the first auction, such as described with respect to the method 400 of FIGS. 4A-4B.

At 708, a first impression indication is received. For example, the first impression indication may be received from the first client device and/or a server associated with the first internet resource (and/or a different server). The first client device and/or the server associated with the first internet resource (and/or a different server) may transmit the first impression indication responsive to determining that the first content item is presented via the first client device. The first impression indication is indicative of whether the first content item is presented via the first client device, and thus, may be indicative of whether the first content item is a winner of the first auction. For example, whether the first content item is a winner of the first auction may be determined based upon whether the first content item is presented via the first client device (e.g., the first content item is presented via the first client device and/or the first internet resource if the first content item wins the first auction). Alternatively and/or additionally, the first impression indication may be indicative of whether the first content item is the winner of the first auction, such as whether the first shaded bid value associated with the first content item is a highest bid value of a plurality of bid values participating in the first auction.

At 710, a first set of auction information associated with the first auction is stored in an auction information database. The first set of auction information is indicative of the first set of features, the first impression indication, the first bid value and/or the first shaded bid value. In some examples, the auction information database comprises a plurality of sets of auction information, comprising the first set of auction information, associated with a plurality of auctions comprising the first auction. For example, a set of auction information of the plurality of sets of auction information (and/or each set of auction information of the plurality of sets of auction information) is associated with an auction of the plurality of auctions and/or comprises a set of features associated with the auction, a bid value determined responsive to receiving a bid request associated with the auction, a shaded bid value submitted for participation in the auction and/or an impression indication indicative of whether the shaded bid value and/or a content item associated with the shaded bid value is a winner of the auction.

At 712, a machine learning model is trained using the plurality of sets of auction information to generate a first machine learning model. The first machine learning model comprises a first plurality of feature parameters associated with a first plurality of features of the plurality of sets of auction information. The first plurality of features may comprise at least some of the first set of features of the first set of auction information and/or other features indicated by sets of auction information, of the plurality of sets of auction information, other than the first set of auction information.

In some examples, the first plurality of feature parameters of the first machine learning model may comprise a plurality of feature weights. For example, a feature parameter of the first plurality of feature parameters (and/or each feature parameter of the first plurality of feature parameters) may comprise a feature weight of the plurality of feature weights. Alternatively and/or additionally, the first machine learning model may comprise a bias parameter, such as comprising a bias weight. Alternatively and/or additionally, the first machine learning model may comprise one or more bid parameters. The one or more bid parameters may comprise a first bid parameter, such as comprising a first bid weight. The first plurality of feature parameters, the bias parameter and/or the one or more bid parameters may be generated based upon the plurality of sets of auction information.

In some examples, the first machine learning model is generated by training one or more models, such as a classification model and/or a different type of model, using the plurality of sets of auction information. For example, a win probability model may be trained using the plurality of sets of auction information to generate the first machine learning model with the first plurality of feature parameters, the bias parameter and/or the one or more bid parameters. In an example, the win probability model may comprise $Pr(win) = F(w_0 + \Sigma_{i=1}^{k} w_i x_i + \beta g(b))$, where F corresponds to a first function, $w_0$ corresponds to the bias weight, $\beta$ corresponds to the first bid weight, g(b) corresponds to a second function, b corresponds to a shaded bid value associated with an auction (e.g., a shaded bid value indicated by a set of auction information of the plurality of sets of auction information), k corresponds to a quantity of features associated with the auction, i corresponds to a feature index, x corresponds to a feature associated with the auction and/or w corresponds to a feature weight associated with the feature. In some examples, Pr(win) corresponds to a win probability. In some examples, the win probability corresponds to a probability that a content item associated with shaded bid value b wins the auction responsive to submitting the shaded bid value b to an auction module associated with the auction. For example, the win probability corresponds to a probability that the shaded bid value b is a highest bid value among bid values participating in the auction. In some examples, the first function F is a fitting function that outputs a value (e.g., a win probability) between 0 and 1. In some examples, the output value of the first function increases as shaded bid value b increases (e.g., the first function monotonically increases in b). The first function may be a logistic function or other type of function. In some examples, the second function g(b) is a transformation function. The second function g(b) may be configured such that as shaded bid value b decreases, the output value of the first function decreases (e.g., as the shaded bid value b approaches 0, the output value of the first function approaches 0). In some examples, the second function g(b) corresponds to log b. In some examples, a feature, such as at least one of $x_1, \ldots, x_{k+1}$, is equal to log b. In an example, the first win probability may correspond to $(1+e^{-(w_0+\Sigma_{i=1}^k w_i x_i + \beta \ \log \ b)})^{-1}$. In some examples, the win probability model may be trained using the plurality of sets of auction information to determine (e.g., learn) at least one of the first plurality of feature parameters (e.g., the plurality of feature weights), the bias parameter (e.g., the bias weight), the one or more bid parameters (e.g., the first bid weight), etc. Alternatively and/or additionally, the first plurality of feature parameters, the bias parameter and/or the one or more bid parameters may be generated based upon the plurality of sets of auction information using one or more techniques other than machine learning model training.

In some examples, the first plurality of sets of auction information may be analyzed to determine a plurality of win-rates associated with the first plurality of features and/or a first plurality of shaded bid values of the plurality of sets of auction information. The first plurality of shaded bid values may comprise the first shaded bid value of the first set of auction information and/or other shaded bid values indicated by sets of auction information, of the plurality of sets of auction information, other than the first set of auction information. A win-rate may correspond to a rate at which a shaded bid value wins auctions, associated with one or more features of the first plurality of features, in which the shaded bid value and/or a lower shaded bid value participates. In an example, the plurality of win-rates may comprise one or more win-rates associated with the first shaded bid value. Each win-rate of the one or more win-rates may be associated with the first shaded bid value and one or more features of the first plurality of features. For example, the plurality of win-rates may comprise a first win-rate associated with the first shaded bid value and/or a set of one or more features (e.g., one or more features corresponding to at least one of an internet resource, a domain name, a top-level domain, a web address, a time of day, a day of week, etc.). The first win-rate may be determined based upon a first quantity of won auctions associated with the set of one or more features and/or a second quantity of lost auctions associated with the set of one or more features. The first quantity of won auctions may correspond to a quantity of a plurality of auctions that are associated with the set of one or more features, where in each auction of the plurality of auctions, a bid value equal to (and/or less than) the first shaded bid value participates and wins the auction. The first quantity of lost auctions may correspond to a quantity of a plurality of auctions that are associated with the set of one or more features, where in each auction of the plurality of auctions, a bid value equal to (and/or higher than) the first shaded bid value participates and loses the auction. For example, it may be determined that in auctions associated with the set of one or more features, the first win-rate of the first shaded bid value is 60% (e.g., the first shaded bid value would win 60% of auctions associated with the set of one or more features and/or would lose 40% of auctions associated with the second of one or more features).

In some examples, the first plurality of feature parameters associated with the first plurality of feature, the bias parameter and/or the one or more bid parameters are generated based upon the plurality of win-rates associated with the first plurality of features and/or the first plurality of shaded bid values. For example, the win probability model may be trained using the plurality of win-rates and/or the plurality of sets of auction information to determine (e.g., learn) at least one of the first plurality of feature parameters (e.g., the plurality of feature weights), the bias parameter (e.g., the bias weight), the one or more bid parameters (e.g., the first bid weight), etc. In some examples, the first machine learning model is configured to output a shaded bid value based upon an input comprising at least one of a set of features associated with an auction (e.g., the first set of features associated with the first auction), a bid value determined responsive to receiving a bid request associated with the auction (e.g., the first bid value determined responsive to receiving the first bid request), etc. Machine learning model training may be performed, using the plurality of win-rates and/or the plurality of sets of auction information, to generate the first machine learning model. The machine learning model training may comprise optimizing the first machine learning model (e.g., generating and/or adjusting the first plurality of feature parameters) using the plurality of win-rates and/or the plurality of sets of auction information. Optimizing the first machine learning model (and/or generating and/or adjusting the first plurality of feature parameters) provides for an improvement to the first machine learning model such that shaded bid values output by the first machine learning model result in at least one of an increased bid surplus associated with a second plurality of auctions for which shaded bid values are determined using the first machine learning model, an increased quantity of auctions, of the second plurality of auctions, that are won using shaded bid values determined using the first machine learning model, etc.

At 714, a second bid request is received. In some examples, the second bid request is associated with a second request for content associated with a second client device. The second request for content may correspond to a request to be provided with one or more content items (e.g., advertisements, images, links, videos, etc.) for presentation via a second internet resource, such as in one or more serving areas of the second internet resource. The second internet resource corresponds to at least one of a web page of a website associated with the content system, an application associated with the content system, an internet game associated with the content system, etc.

The second request for content may be received by a second supply-side server and/or a second content exchange (e.g., an ad exchange). The supply-side server may be associated with a second SSP associated with the content system. The second supply-side server and/or the second content exchange may transmit the second bid request to a second DSP. The second bid request may correspond to a request for one or more bid values for participation in a second auction associated with the second request for content.

In some examples, the second bid request may be indicative of a second set of features. The second set of features comprises one or more second features associated with the second request for content, the second internet resource and/or the second client device. In an example, the second set of features may comprise at least one of the second internet resource, a domain name of the second internet resource, a top-level domain associated with the second internet resource, at least some of a web address of the second internet resource, etc. Alternatively and/or additionally, the second set of features may comprise a second time of day associated with the second request for content. The second time of day may correspond to a current time of day and/or a time of day of transmission of the second request for content. In some examples, the second time of day may correspond to a local time of day, such as a time of day at a second location associated with the second client device. Alternatively and/or additionally, the second set of features may comprise a second day of week (e.g., a local day of week associated with the second location) associated with the second request for content. Alternatively and/or additionally, the second set of features may comprise the second location associated with the second client device (e.g., at least one of a region, a state, a province, a country, etc. associated with the second client device). Alternatively and/or additionally, the second set of features may comprise information associated with the second client device, such as an indication of the second client device (such as at least one of a device identifier associated with the second client device, an IP address associated with the second client device, a carrier identifier indicative of carrier information associated with the second client device, a user identifier (e.g., at least one of a username associated with a second user account associated with the second client device, an email address, a user account identifier, etc.) associated with the second client device, a browser cookie, etc.).

At 716, a second bid value associated with a second content item is determined. The second bid value may be determined based upon second content information associated with the second content item and/or a second entity associated with the second content item. In some examples, the second entity may be an advertiser, a company, a brand, an organization, etc. Alternatively and/or additionally, the second content item may comprise at least one of an image, a video, audio, an interactive graphical object, etc. In some examples, the second content item may be an advertisement associated with the second entity (e.g., the advertisement may be used to promote one or more products, one or more services, etc. provided by the second entity).

In some examples, the second bid value may be determined based upon at least one of a second budget associated with the second content item, a second target audience associated with the second content item, one or more second advertisement campaign goals associated with the second content item, a second content item bid value associated with the second content item received from the second entity, etc.

Alternatively and/or additionally, the second bid value may be determined based upon a second click probability associated with the second content item, such as using one or more of the techniques presented herein. Alternatively and/or additionally, the second bid value may be determined based upon a second conversion probability associated with the second content item, such as using one or more of the techniques presented herein. In some examples, the second click probability and/or the second conversion probability may be determined based upon a second user profile associated with the second client device and/or the second content information associated with the second content item and/or the second entity.

Alternatively and/or additionally, the second bid value may correspond to a value of presenting the second content item via the second client device, such as determined based upon at least one of the second click probability, an amount of revenue (such as received by the second entity and/or one or more other entities) associated with receiving a selection of the second content item via the second client device, the second conversion probability, an amount of revenue associated with the second client device performing a conversion event associated with the second content item, etc. In some examples, the second bid value may correspond to an unshaded bid value. In some examples, such as where the second auction is a first-price auction, the second bid value may correspond to a bid value that is used if the second auction is a second-price auction.

At 718, a plurality of win probabilities associated with a second plurality of shaded bid values is determined using the first machine learning model based upon the second set of features. In some examples, a shaded bid value of the second plurality of shaded bid values (and/or each shaded bid value of the second plurality of shaded bid values) does not exceed the second bid value. A win probability of the plurality of win probabilities (and/or each win probability of the plurality of win probabilities) is associated with a shaded bid value of the second plurality of shaded bid values and corresponds to a probability that the second content item wins the second auction responsive to submitting the shaded bid value to an auction module associated with the second request for content.

The plurality of win probabilities associated with the second plurality of shaded bid values may be determined based upon one or more first feature parameters, of the first plurality of feature parameters, associated with the second set of features (associated with the second request for content). In some examples, the first plurality of feature parameters may be analyzed based upon the second set of features to identify the one or more first feature parameters, from the first plurality of feature parameters, that are associated with the one or more second features of the second set of features. Alternatively and/or additionally, the plurality of win probabilities associated with the second plurality of shaded bid values may be determined using the first machine learning model based upon the one or more first feature parameters, the one or more bid parameters (e.g., the first bid parameter comprising the first bid weight) and/or the bias parameter (e.g., the bias weight). In some examples, the plurality of win probabilities may be determined based upon the one or more first feature parameters, the one or more bid parameters and/or the bias parameter using a non-machine learning function and/or a non-machine learning system.

In some examples, the second plurality of shaded bid values comprises a second shaded bid value and the plurality of win probabilities comprises a first win probability associated with the second shaded bid value. The first win probability corresponds to a probability that the second content item wins the second auction responsive to submitting the second shaded bid value to an auction module associated with the second request for content. In some examples, the first win probability may be determined based upon the one or more first feature parameters associated with the second set of features (associated with the second request for content), the first bid parameter and/or the bias parameter. In some examples, one or more operations (e.g., mathematical operations) may be performed using the one or more first feature parameters, the first bid parameter and/or the bias parameter to determine the first win probability associated with the second shaded bid value.

The one or more first feature parameters may comprise one or more first feature weights associated with the one or more second features of the second set of features. For example, a feature parameter of the one or more first feature parameters (and/or each feature parameter of the one or more first feature parameters) may be indicative of a weight of the one or more first feature weights. In some examples, one or more operations (e.g., mathematical operations) may be performed using the second shaded bid value, the one or more first feature weights, the bias weight and/or the first bid weight to determine the first win probability associated with the second shaded bid value. In some examples, the win probability model may be used to determine the first win probability. For example, the first win probability may correspond to $F(w_0+\Sigma_{i=1}^{k}w_i x_i+\beta g(b))$, where F corresponds to the first function, $w_0$ corresponds to the bias weight, $\beta$ corresponds to the first bid weight, g(b) corresponds to the second function, b corresponds to the second shaded bid value, k corresponds to a quantity of the one or more second features of the second set of features, i corresponds to a feature index, x corresponds to a feature of the second set of features and/or w corresponds to a feature weight, of the one or more first feature weights, associated with the feature. In some examples, $\Sigma_{i=1}^{k}w_i x_i$ may be determined by determining one or more products, where each product of the one or more products is a product of a feature of the second set of features and a feature weight (of the one or more first feature weights) associated with the feature, and/or combining (e.g., summing) the one or more products. In some examples, a feature of the second set of features, such as at least one of $x_1, \ldots, x_{k+1}$, is equal to log b. In an example, the first win probability may correspond to $(1+e^{-(w_0+\Sigma_{i=1}^{k}w_i x_i+\beta \log b)})^{-1}$.

In some examples, the plurality of win probabilities associated with the second plurality of shaded bid values may comprise the first win probability associated with the second shaded bid value and/or one or more other win probabilities associated with other shaded bid values of the second plurality of shaded bid values. The one or more other win probabilities may be determined using one or more of the techniques described herein with respect to determining the first win probability. In some examples, the plurality of win probabilities may correspond to a distribution of win probabilities associated with shaded bid values with respect to the second auction.

At 720, a third shaded bid value for participation in the second auction may be determined based upon the second plurality of shaded bid values and/or the plurality of win probabilities. In some examples, the third shaded bid value may be a shaded bid value of the second plurality of shaded bid values that is selected from the second plurality of shaded bid values for participation in the second auction. Alternatively and/or additionally, the third shaded bid value may be generated based upon the second plurality of shaded bid values and/or the plurality of win probabilities.

In some examples, the third shaded bid value may be associated with a second win probability (of the plurality of win probabilities, for example). In some examples, the third shaded bid value may be submitted for participation in the second auction based upon a determination that the second win probability associated with the third shaded bid value at least one of exceeds a threshold win probability or is within a desired win probability range.

In some examples, a plurality of expected bid surpluses associated with the second plurality of shaded bid values may be determined based upon the one or more first feature parameters associated with the second set of features, the bias parameter and/or the first bid parameter. The plurality of expected bid surpluses may be used to determine the third shaded bid value for participation in the second auction. In some examples, the plurality of expected bid surpluses may be used to determine the third shaded bid value for participation in the second auction rather than (and/or in addition to) using the plurality of win probabilities associated with the second plurality of shaded bid values to determine the third shaded bid value for participation in the second auction. Alternatively and/or additionally, the plurality of expected bid surpluses may be determined based upon the plurality of win probabilities. Alternatively and/or additionally, an expected bid surplus, of the plurality of expected bid surpluses, associated with a shaded bid value of the second plurality of shaded bid values may be determined based upon at least one of the second bid value, the shaded bid value, the bias parameter, the first bid parameter and/or the one or more first feature parameters. In an example, the expected bid surplus may be determined using a bid surplus function. The bid surplus function may comprise $$\frac{V-b}{1+e^{-\alpha}b^{-\beta}},$$

where V corresponds to the second bid value and/or $\alpha$ corresponds to $w_0+\Sigma_{i=1}^{k}w_i x_i$.

In some examples, the third shaded bid value may be associated with a first expected bid surplus of the plurality of expected bid surpluses associated with the second plurality of shaded bid values. In some examples, the third shaded bid value may be submitted for participation in the second auction based upon a determination that the first expected bid surplus associated with the third shaded bid value exceeds a threshold bid surplus. Alternatively and/or additionally, the third shaded bid value may be submitted for participation in the second auction based upon a determination that the first expected bid surplus associated with the third shaded bid value exceeds the threshold bid surplus and the second win probability associated with the third shaded bid value at least one of exceeds the threshold win probability or is within the desired win probability range.

Alternatively and/or additionally, the third shaded bid value may be submitted for participation in the second auction based upon a determination that the third shaded bid value is an optimal shaded bid value associated with a maximum expected bid surplus across the plurality of expected bid surpluses (e.g., the first expected bid surplus associated with the third shaded bid value is the maximum expected bid surplus of the plurality of expected bid surpluses). In some examples, the third shaded bid value may be identified (as being the optimal shaded bid value) by performing a bisection search and/or using one or more other techniques. In some examples, the third shaded bid value may be determined using the bid surplus function. For example, the third shaded bid value may correspond to the argument of the maximum of the bid surplus function $$\left(\text{e.g., } \underset{b>0}{\operatorname{argmax}} \frac{V-b}{1+e^{-\alpha}b^{-\beta}}\right),$$

which may be solved by performing a bisection search of the bid surplus function and/or using one or more other techniques. In an example, the third shaded bid value may satisfy a condition $$\frac{\beta}{\beta+1+e^{\alpha}V^{\beta}}V \le b^* < \frac{\beta}{\beta+1}V,$$

where b* corresponds to the third shaded bid value.

Figure 8A:
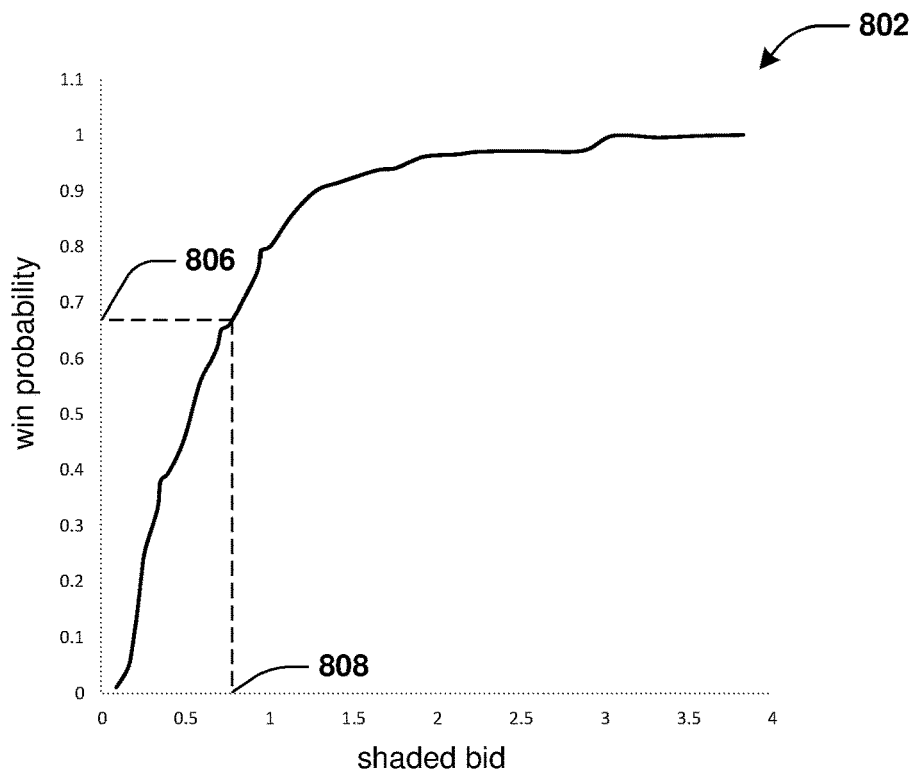
FIG. 8A illustrates a win probability chart.

FIG. 8A illustrates a win probability chart 802 illustrating an example of a win probability curve associated with the plurality of win probabilities, described with respect to the method 700 of FIGS. 7A-7B. The vertical axis of the win probability chart 802 may be indicative of win probabilities and/or the horizontal axis of the win probability chart 802 may be indicative of shaded bid values. The win probability curve of the win probability chart 802 may be indicative of the plurality of win probabilities with respect to the second plurality of shaded bid values. In some examples, the third shaded bid value (shown with reference number 808) may be submitted for participation in the second auction based upon a determination that the second win probability (shown with reference number 806) associated with the third shaded bid value 808 at least one of exceeds the threshold win probability (e.g., 0.65), is within the desired win probability range (e.g., between 0.65 and 0.70), or is equal to a desired win probability (e.g., 0.675).

Figure 8B:
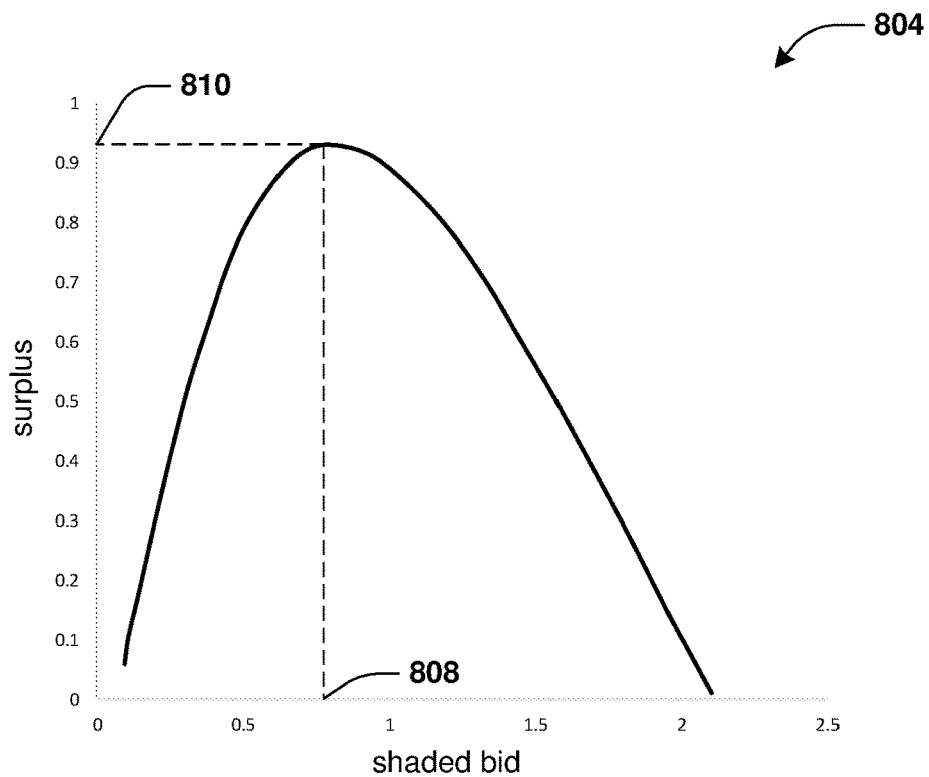
FIG. 8B illustrates an expected bid surplus chart.

FIG. 8B illustrates an expected bid surplus chart 804 illustrating an example of an expected bid surplus curve associated with the second plurality of shaded bid values, described with respect to the method 700 of FIGS. 7A-7B. The vertical axis of the expected bid surplus chart 804 may be indicative of expected bid surpluses and/or the horizontal axis of the expected bid surplus chart 804 may be indicative of shaded bid values. The expected bid surplus curve of the expected bid surplus chart 804 may be indicative of the plurality of expected bid surpluses with respect to the second plurality of shaded bid values. In some examples, the third shaded bid value 808 may be submitted for participation in the second auction based upon a determination that the first expected bid surplus (shown with reference number 810) associated with the third shaded bid value 808 at least one of exceeds the threshold bid surplus (e.g., 0.9) or is a maximum expected bid surplus of the expected bid surplus curve. In an example where the first expected bid surplus 810 is the maximum expected bid surplus of the expected bid surplus curve, the third shaded bid value 808 and/or the first expected bid surplus 810 may be determined by performing a bisection search of the expected bid surplus curve and/or using one or more other techniques.

At 722, the third shaded bid value is submitted to a second auction module for participation in the second auction associated with the second request for content. In some examples, the second auction module corresponds to the second SSP and/or the second content exchange. Accordingly, the third shaded bid value may be submitted to the second auction module by transmitting the third shaded bid value to the second SSP and/or the second content exchange. The second auction module may be the same as the first auction module. Alternatively and/or additionally, the second auction module may be different than the first auction module.

In some examples, the second auction module may analyze a plurality of bid values participating in the second auction to identify a winner of the second auction. For example, the second auction module may determine that the third shaded bid value and/or the second content item associated with the third shaded bid value are the winner of the second auction based upon a determination that the third shaded bid value is a highest bid value of the plurality of bid values. In some examples, responsive to determining that the third shaded bid value and/or the second content item associated with the third shaded bid value are the winner of the second auction, the second content item may be transmitted to the second client device. For example, the second content item may be presented via the second client device.

Figure 9:
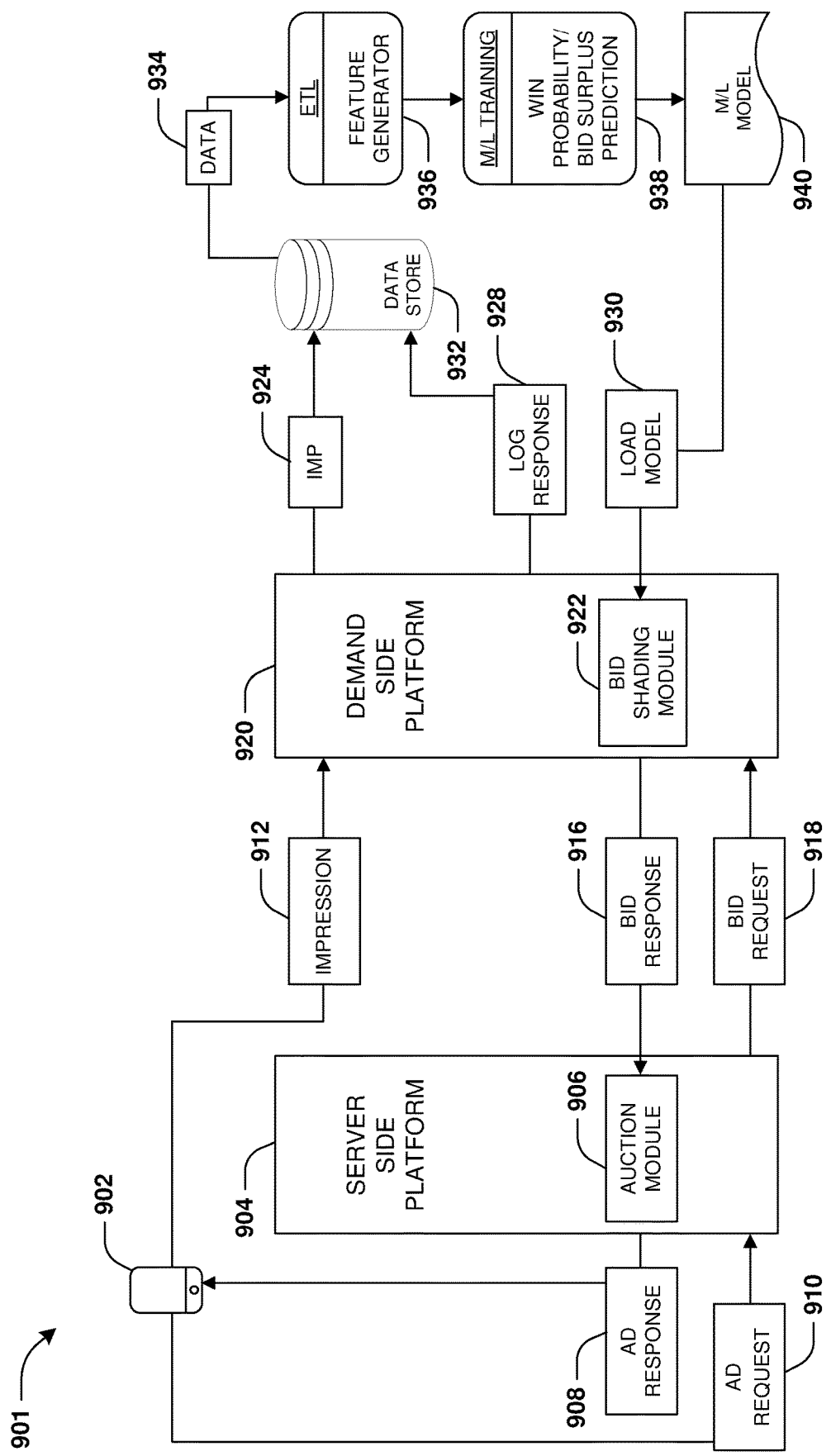
FIG. 9 is a component block diagram illustrating an example system for determining bid values for participation in auctions.

FIG. 9 illustrates an example of a system 901 for determining bid values for participation in auctions, described with respect to the method 700 of FIGS. 7A-7B. In some examples, an SSP 904 may receive a request for content 910 (e.g., an advertisement request) from a client device 902. Responsive to receiving the request for content 910, the SSP 904 may transmit a bid request 918 to a DSP 920. Responsive to receiving the bid request 918, the DSP 920 may submit a bid response 916 to an auction module 906 (such as the first auction module and/or the second auction module) of the SSP 904. The bid response 916 may comprise a bid value (e.g., a shaded bid value such as the first shaded bid value and/or the second shaded bid value) for participation in an auction associated with the request for content 910. In some examples, the auction module 906 determines a winner of the auction and/or transmits a response 908 to the client device 902 based upon the winner. In an example where a content item associated with the bid value is the winner of the auction, the content item may be presented via the client device 902 and/or an impression indication 912 (e.g., the first impression indication) may be transmitted to the DSP 920. The impression indication 912 may be indicative of the content item being presented via the client device 902. In some examples, a set of auction information (e.g., the first set of auction information) may be stored in a data store 932 (e.g., the auction information database). The set of auction information may comprise a second impression indication 924 (such as indicative of the impression indication 912), response information 928 (such as indicative of the bid response 916 and/or the bid value indicated by the bid response 916), and/or indications of one or more features (e.g., the one or more first features) associated with the request for content 910 and/or the bid request 918. Historical auction information (e.g., the plurality of sets of auction information) may be stored on the data store 932. Data 934 (e.g., the plurality of sets of auction information) from the data store 932 may be input to a module 936, such as an ETL module 936. The module 936 is configured to extract features from the data 934 and/or generate features based upon the data 934. Information, such as at least one of indications of features from the module 936, impression indications, bid values submitted to auction modules, etc. may be input to a machine learning training module 938 configured to generate a machine learning model 940 (e.g., the first machine learning model) with learned parameters (e.g., the first plurality of feature parameters, the one or more bid parameters and/or the bias parameter). The machine learning model 940 may be loaded 930 onto a bid shading module 922 of the DSP 920. The bid shading module 922 (and/or the machine learning model 940 with the learned parameters) may be used to determine shaded bid values for participation in auctions. In an example, responsive to receiving a second bid request, the DSP 920 may determine a bid value (e.g., an unshaded bid value). The bid value and/or one or more features associated with the second bid request may be input to the bid shading module 922. The bid shading module 922 may output a shaded bid value (using the machine learning model 940 with the learned parameters), such as using one or more techniques described herein with respect to determining the second shaded bid value.

In some examples, one or more of the techniques and/or systems presented herein may be used for determining bid values (e.g., shaded bid values) for participation in various types of auctions, such as first-price auctions. In some examples, one or more of the techniques and/or systems described with respect to the method 400 of FIGS. 4A-4B, the system 501 of FIGS. 5A-5G and/or the system 601 of FIG. 6, may be used for determining bid values (e.g., shaded bid values) for participation in various types of auctions, such as open first-price auctions where feedback indicative of a minimum bid to win value is provided after auctions are performed. In some examples, one or more of the techniques and/or systems described with respect to the method 700 of FIGS. 7A-7B and/or the system 901 of FIG. 9, may be used for determining bid values (e.g., shaded bid values) for participation in various types of auctions, such as open first-price auctions where feedback indicative of a minimum bid to win value is provided after auctions are performed and/or closed first-price auctions where feedback indicative of a minimum bid to win value is not provided after auctions are performed.

Implementation of at least some of the disclosed subject matter may lead to benefits including, but not limited to, about a 20% (and/or a different percentage) increase in total bid surplus associated with a plurality of auctions as compared to some systems that submit shaded bid values that are determined using techniques other than those presented herein. The total bid surplus may correspond to total bid surplus=$\Sigma_{i=1}^{N}(b_i^u-b_i)I(b_i)$, where i corresponds to an auction index associated with the plurality of auctions, N corresponds to a quantity of auctions of the plurality of auctions, $b_i^u$ corresponds to an unshaded bid value associated with an auction of the plurality of auctions, $b_i$ corresponds to a shaded bid value submitted for participation in the auction, $I(b_i)$ is equal to 1 if the shaded bid value won the auction, and/or $I(b_i)$ is equal to 0 if the shaded bid value did not win the auction.

Alternatively and/or additionally, implementation of the disclosed subject matter may lead to benefits including an increase in generalized revenue for presenting content items via client devices (e.g., as a result of the increase in the total bid surplus, as a result of preventing overpaying and/or overbidding for presenting a content item via a client device by determining a shaded bid value using one or more of the techniques presented herein, etc.).

Alternatively and/or additionally, implementation of the disclosed subject matter may lead to benefits including about a 36% (and/or a different percentage) increase in total win-rate associated with a plurality of auctions as compared to some systems that submit shaded bid values that are determined using techniques other than those presented herein. The total win-rate may correspond to $$\text{total win rate} = \frac{1}{N}\sum_{i=1}^{N} I(b_i),$$

where i corresponds to an auction index associated with the plurality of auctions, N corresponds to a quantity of auctions of the plurality of auctions, $I(b_i)$ is equal to 1 if a submitted shaded bid value won an auction of the plurality of auctions, and/or $I(b_i)$ is equal to 0 if the submitted shaded bid value did not win the auction.

In some examples, at least some of the disclosed subject matter may be implemented on a client device, and in some examples, at least some of the disclosed subject matter may be implemented on a server (e.g., hosting a service accessible via a network, such as the Internet).

Figure 10:
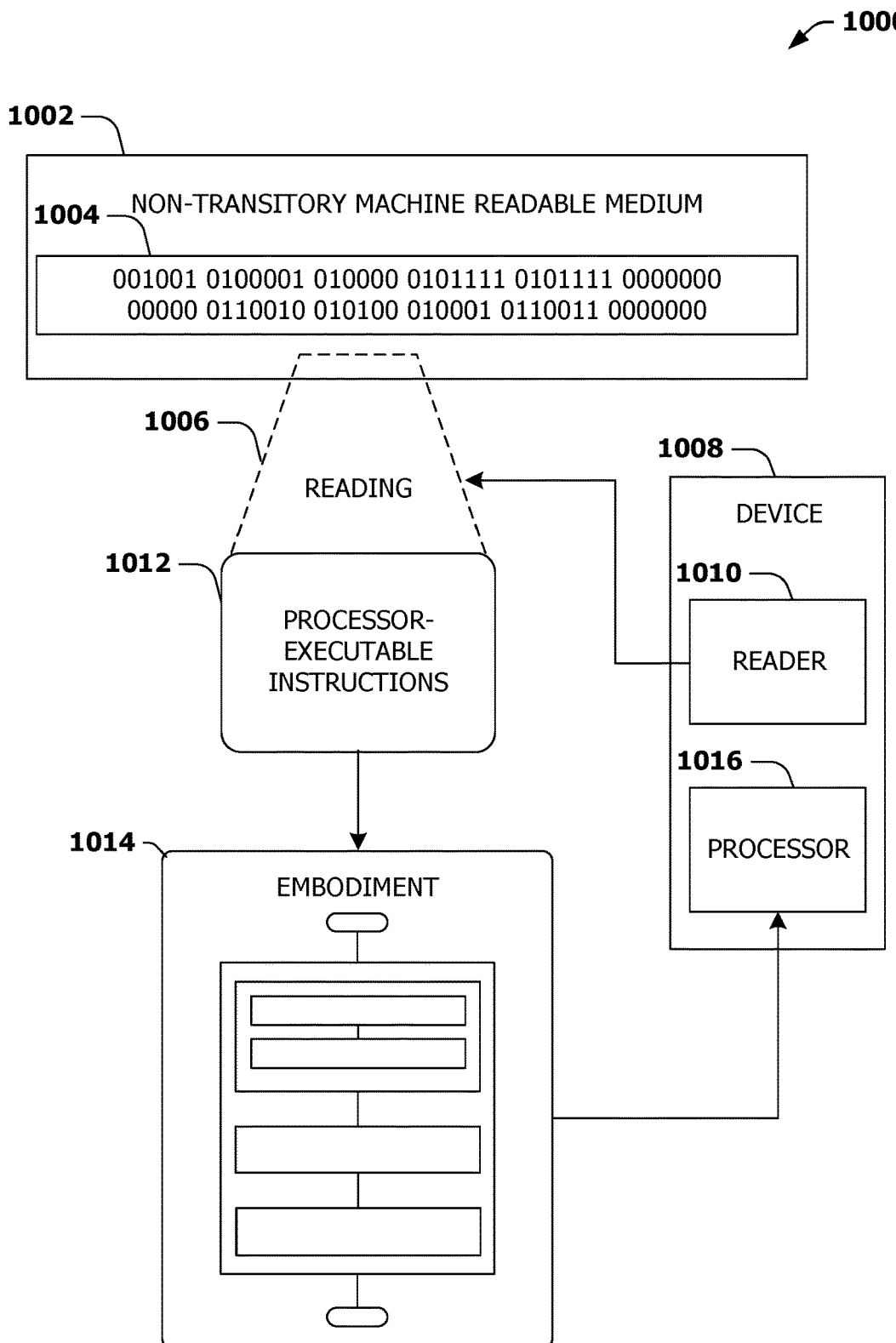
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein (e.g., embodiment 1014). The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed, cause performance of operations, such as at least some of the example method 400 of FIGS. 4A-4B and/or the example method 700 of FIGS. 7A-7B, for example. In some embodiments, the processor-executable instructions 1012 are configured to cause implementation of a system, such as at least some of the example system 501 of FIGS. 5A-5G, the example system 601 of FIG. 6 and/or the example system 901 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
generating, using a first loss function, a plurality of loss values associated with a plurality of sets of auction information, wherein a first loss value of the plurality of loss values is associated with a first set of auction information associated with a first auction;
training a machine learning model using the first loss function, the plurality of loss values and the plurality of sets of auction information to generate a first machine learning model comprising a plurality of feature parameters associated with a plurality of features of the plurality of sets of auction information, wherein:
the first loss function comprises a first value and a second value;
the first value corresponds to:
a first minimum bid value to win the first auction; or
an optimal bid reduction factor determined based upon the first minimum bid value to win the first auction and a first bid value associated with a first content item;
the second value corresponds to:
a first shaded bid value associated with the first content item; or
a bid reduction factor used to determine the first shaded bid value;
the generating the plurality of loss values comprises generating the first loss value based upon a difference between the first value and the second value; and
the first machine learning model is generated using a plurality of win-rates comprising a first win-rate corresponding to a first quantity of won auctions associated with the first shaded bid value;
loading the first machine learning model onto a bid shading module of a demand-side platform (DSP), wherein the DSP is at least partially implemented by a DSP server;
receiving, by the DSP at least partially implemented by the DSP server, a bid request from at least one of a supply-side platform (SSP) server or a content exchange server, wherein:
the bid request is associated with a request for content associated with a client device; and
the bid request is indicative of a set of features comprising one or more features associated with the request for content;
determining a second bid value associated with a second content item;
inputting, into the bid shading module of the DSP at least partially implemented by the DSP server, the second bid value and one or more first feature parameters, of the plurality of feature parameters, associated with the set of features;
determining, using the first machine learning model loaded onto the bid shading module of the DSP at least partially implemented by the DSP server, a second shaded bid value associated with the second content item based upon the second bid value and the one or more first feature parameters, of the plurality of feature parameters, associated with the set of features; and
submitting the second shaded bid value to an auction module that is at least partially implemented by at least one of the SSP server or the content exchange server for participation in a second auction associated with the request for content,
wherein the second content item is provided for presentation on the client device associated with the request for content based upon a determination that the second content item is a winner of the second auction, wherein use of the first machine learning model that was generated using the plurality of win-rates increases a total win-rate associated with a plurality of auctions.

2. The method of claim 1, wherein the determining the second shaded bid value comprises:
determining, based upon the one or more first feature parameters, the bid reduction factor; and
applying the bid reduction factor to the second bid value to determine the second shaded bid value.

3. The method of claim 1, wherein:
a first feature parameter, of the one or more first feature parameters, is associated with a first feature of the set of features; and
the first feature parameter comprises:
a first weight associated with the first feature; and
a first vector representation of the first feature.

4. The method of claim 3, wherein the determining the second shaded bid value comprises:
determining interactions between pairs of features of the set of features; and
combining the interactions to determine the second shaded bid value.

5. The method of claim 4, wherein the determining the interactions comprises:
determining a first interaction between the first feature and a second feature of the set of features based upon the first vector representation and a second vector representation, of a second feature parameter, associated with the second feature.

6. The method of claim 1, wherein the first win-rate is associated with one or more features corresponding to at least one of an internet resource, a domain name, a top-level domain or a web address.

7. The method of claim 1, wherein:
the determining the first shaded bid value comprises:
determining, based upon one or more feature parameters, the bid reduction factor; and
applying the bid reduction factor to the first bid value to determine the first shaded bid value; and
the second value corresponds to the bid reduction factor, the method comprising:
determining the optimal bid reduction factor associated with the first auction based upon the first minimum bid value to win and the first bid value, wherein the first value to win corresponds to the optimal bid reduction factor.

8. The method of claim 7, wherein:
the first loss value is greater if the optimal bid reduction factor exceeds the bid reduction factor by a first difference than if the optimal bid reduction factor is less than the bid reduction factor by the first difference.

9. The method of claim 1, wherein:
the first value corresponds to the first minimum bid value; and
the second value corresponds to the first shaded bid value.

10. The method of claim 9, wherein:
the first loss value is greater if the first shaded bid value is less than the first minimum bid value by a first difference than if the first shaded bid value exceeds the first minimum bid value by the first difference.

11. The method of claim 1, wherein:
the generating the first loss value is performed based upon a difference between the first bid value and the first minimum bid value.

12. The method of claim 1, wherein:
the training the machine learning model to generate the first machine learning model is performed based upon the plurality of loss values.

13. The method of claim 1, wherein:
the second auction is a first-price auction.

14. The method of claim 1, wherein:
the first shaded bid value is less than the first bid value.

15. The method of claim 1, wherein:
the second shaded bid value is less than the second bid value.

16. The method of claim 1, wherein:
the set of features comprises at least one of:
a second internet resource associated with the request for content;
a second time of day associated with the request for content;
a second day of week associated with the request for content; or
a second location associated with the client device.

17. A computing device comprising:
a processor; and
memory comprising processor-executable instructions that when executed by the processor cause performance of operations, the operations comprising:
generating, using a first loss function, a plurality of loss values associated with a plurality of sets of auction information, wherein a first loss value of the plurality of loss values is associated with a first set of auction information associated with a first auction;
determining a first plurality of values associated with a plurality of auctions, wherein:
the first plurality of values corresponds to:
a plurality of minimum bid values to win indicated by the plurality of sets of auction information; or
a plurality of optimal bid reduction factors determined based upon the plurality of minimum bid values to win and a plurality of bid values indicated by the plurality of sets of auction information; and
a first value of the first plurality of values corresponds to:
a first minimum bid value to win the first auction; or
a first optimal bid reduction factor determined based upon the first minimum bid value to win the first auction and a first bid value associated with a first content item;
determining a second plurality of values associated with the plurality of auctions, wherein:
the second plurality of values corresponds to:
a plurality of shaded bid values indicated by the plurality of sets of auction information; or
a plurality of bid reduction factors used to determine the plurality of shaded bid values;
a second value of the second plurality of values corresponds to:
a first shaded bid value associated with the first content item; or
a first bid reduction factor used to determine the first shaded bid value; and
the generating the plurality of loss values comprises generating the first loss value based upon a difference between the first value and the second value;
determining, based upon the first plurality of values and the second plurality of values, a plurality of differences, wherein a first difference of the plurality of differences corresponds to a difference between the first value and the second value;
generating, based upon the plurality of sets of auction information and the plurality of differences, a plurality of feature parameters associated with a plurality of features of the plurality of sets of auction information;
receiving, by a demand-side platform (DSP), a bid request, wherein:
the bid request is associated with a second request for content associated with a client device; and
the bid request is indicative of a set of features comprising one or more features associated with the second request for content;
determining a second bid value associated with a second content item;
identifying one or more first feature parameters, of the plurality of feature parameters, associated with the set of features;
inputting, into a bid shading module of the DSP, the second bid value and the one or more first feature parameters, wherein the bid shading module of the DSP uses a plurality of win-rates comprising a first win-rate corresponding to a first quantity of won auctions associated with the first shaded bid value;

determining, using the bid shading module of the DSP and based upon the one or more first feature parameters and the second bid value, a second shaded bid value; and submitting the second shaded bid value to an auction module for participation in a second auction associated with the second request for content, wherein the second content item is provided for presentation on the client device associated with the second request for content based upon a determination that the second content item is a winner of the second auction, wherein use of the plurality of win-rates by the bid shading module of the DSP increases a total win-rate associated with a plurality of auctions.

18. The computing device of claim 17, wherein:
the first plurality of values corresponds to the plurality of minimum bid values; and
the second plurality of values corresponds to the plurality of shaded bid values.

19. The computing device of claim 17, wherein:
the determining the first shaded bid value comprises:
determining, based upon one or more feature parameters, the first bid reduction factor; and
applying the first bid reduction factor to the first bid value to determine the first shaded bid value; and
the second plurality of values corresponds to the plurality of bid reduction factors, comprising the first bid reduction factor, associated with the plurality of auctions, the operations comprising:
determining the first optimal bid reduction factor associated with the first auction based upon the first minimum bid value to win and the first bid value, wherein the first plurality of values corresponds to the plurality of optimal bid reduction factors, comprising the first optimal bid reduction factor, associated with the plurality of auctions.

20. A non-transitory machine readable medium having stored thereon processor-executable instructions that when executed cause performance of operations, the operations comprising:
generating, using a first loss function, a plurality of loss values associated with a plurality of sets of auction information, wherein a first loss value of the plurality of loss values is associated with a first set of auction information associated with a first auction;
training a machine learning model using the first loss function, the plurality of loss values and the plurality of sets of auction information to generate a first machine learning model comprising a plurality of feature parameters associated with a plurality of features of the plurality of sets of auction information, wherein:
the first loss function comprises a first value and a second value;
the first value corresponds to:
a first minimum bid value to win the first auction; or
an optimal bid reduction factor determined based upon the first minimum bid value to win the first auction and a first bid value associated with a first content item;
the second value corresponds to:
a first shaded bid value associated with the first content item; or
a bid reduction factor used to determine the first shaded bid value;
the generating the plurality of loss values comprises generating the first loss value based upon a difference between the first value and the second value; and
the first machine learning model is generated using a plurality of win-rates comprising a first win-rate corresponding to a first quantity of won auctions associated with the first shaded bid value;
loading the first machine learning model onto a bid shading module of a demand-side platform (DSP), wherein the DSP is at least partially implemented by a DSP server;
receiving, by the DSP at least partially implemented by the DSP server, a bid request from at least one of a supply-side platform (SSP) server or a content exchange server, wherein:
the bid request is associated with a request for content associated with a client device; and
the bid request is indicative of a set of features comprising one or more features associated with the request for content;
determining a second bid value associated with a second content item;
inputting, into the bid shading module of the DSP at least partially implemented by the DSP server, the second bid value and one or more first feature parameters, of the plurality of feature parameters, associated with the set of features;
determining, using the first machine learning model loaded onto the bid shading module of the DSP at least partially implemented by the DSP server, a second shaded bid value associated with the second content item based upon the second bid value and the one or more first feature parameters, of the plurality of feature parameters, associated with the set of features; and
submitting the second shaded bid value to an auction module that is at least partially implemented by at least one of the SSP server or the content exchange server for participation in a second auction associated with the request for content,
wherein the second content item is provided for presentation on the client device associated with the request for content based upon a determination that the second content item is a winner of the second auction, wherein use of the first machine learning model that was generated using the plurality of win-rates increases a total win-rate associated with a plurality of auctions.

* * * * *